(12) United States Patent
Lopez et al.

(10) Patent No.: US 11,734,986 B2
(45) Date of Patent: *Aug. 22, 2023

(54) VENDING MACHINE AND TRANSPORT CARTRIDGE SYSTEMS AND METHODS

(71) Applicant: 24/7 Pizza Box, LLC, Sarasota, FL (US)

(72) Inventors: Eduardo Lopez, Sarasota, FL (US);
Shawn Marquardt, Sarasota, FL (US);
Allan L. Cube, Morgan Hill, CA (US);
Sun Shue, Newark, CA (US);
Juarencio P. Baculi, Jr., Milpitas, CA (US)

(73) Assignee: 24/7 Pizza Box, LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,781

(22) Filed: Jan. 13, 2023

(65) Prior Publication Data

US 2023/0154272 A1 May 18, 2023

Related U.S. Application Data

(63) Continuation of application No. 17/528,518, filed on Nov. 17, 2021, now Pat. No. 11,557,166, which is a
(Continued)

(51) Int. Cl.
*G07F 11/62* (2006.01)
*G07F 11/72* (2006.01)
(Continued)

(52) U.S. Cl.
CPC ............. *G07F 11/72* (2013.01); *A47J 39/006* (2013.01); *A47J 47/01* (2013.01); *G07F 11/04* (2013.01);
(Continued)

(58) Field of Classification Search
CPC ......... A47J 47/01; A47J 39/006; G07F 11/16; G07F 11/62; G07F 17/0064; G07F 11/165
See application file for complete search history.

(56) References Cited

U.S. PATENT DOCUMENTS

| 3,866,795 A | 2/1975 | Urano |
| 4,326,497 A | 4/1982 | Guibert |

(Continued)

FOREIGN PATENT DOCUMENTS

| CN | 203287987 U | 11/2013 |
| WO | 2018157987 A1 | 9/2018 |
| WO | 2019204459 A1 | 10/2019 |

OTHER PUBLICATIONS

International Search Report (ISR) for PCT/US2019/027894 dated Jul. 11, 2019 (4 pages).
(Continued)

*Primary Examiner* — Timothy R Waggoner
(74) *Attorney, Agent, or Firm* — Shumaker, Loop & Kendrick, LLP

(57) ABSTRACT

A vending machine system for loading and dispensing pre-baked unpackaged food including a fixed cartridge disposed in a refrigerator of a vending machine, and a transport cartridge adapted to removably attach to the fixed cartridge, the transport cartridge operable for holding trays of unpackaged food and loading the trays of unpackaged food from the transport cartridge into the fixed cartridge, wherein, when the transport cartridge is removably attached to the fixed cartridge, a front opening of the transport cartridge aligns with a front opening of the fixed cartridge, and wherein the rack of the transport cartridge aligns with the conveyor system of the fixed cartridge such that trays of unpackaged food within the transport cartridge can simultaneously be transitioned from the rack to the conveyor system.

5 Claims, 24 Drawing Sheets

Related U.S. Application Data continuation of application No. 17/106,686, filed on Nov. 30, 2020, now Pat. No. 11,191,394, which is a continuation of application No. 16/632,660, filed as application No. PCT/US2019/027894 on Apr. 17, 2019, now Pat. No. 10,863,867, which is a continuation of application No. 15/957,370, filed on Apr. 19, 2018, now Pat. No. 10,546,445.

(51) Int. Cl.

| | | |
|---|---|---|
| *G07F 11/04* | (2006.01) | |
| *A47J 39/00* | (2006.01) | |
| *A47J 47/01* | (2006.01) | |
| *G07F 11/16* | (2006.01) | |
| *G07F 17/00* | (2006.01) | |

(52) U.S. Cl.
CPC ............ *G07F 11/16* (2013.01); *G07F 11/165* (2013.01); *G07F 11/62* (2013.01); *G07F 17/0078* (2013.01)

(56) References Cited

U.S. PATENT DOCUMENTS

| | | |
|---|---|---|
| 5,240,139 A | 8/1993 | Chirnomas |
| 5,245,150 A | 9/1993 | Grandi |
| 5,503,300 A | 4/1996 | Prescott et al. |
| 5,516,002 A | 5/1996 | Morillo |
| 5,522,310 A | 6/1996 | Black, Sr. et al. |
| 6,230,930 B1 | 5/2001 | Sorensen et al. |
| 6,253,955 B1 | 7/2001 | Bower |
| 6,513,677 B1 | 2/2003 | Sorensen et al. |
| 7,137,529 B2 | 11/2006 | Martinelli et al. |
| 7,584,869 B2 | 9/2009 | DeLazzer et al. |
| 7,647,865 B2 | 1/2010 | Vidondo |
| 8,346,387 B2 | 1/2013 | Yepez et al. |
| 8,651,324 B2 | 2/2014 | Borghi |
| 10,526,142 B2 | 1/2020 | Jin et al. |
| 10,546,445 B2 | 1/2020 | Lopez et al. |
| 10,863,867 B2 * | 12/2020 | Lopez .................. A47J 47/01 |
| 11,557,166 B2 | 1/2023 | Lopez et al. |
| 2001/0002674 A1 | 6/2001 | Gubbini et al. |
| 2003/0141315 A1 | 7/2003 | Chirnomas |
| 2004/0026445 A1 | 2/2004 | Chirnomas |
| 2004/0169048 A1 | 9/2004 | Simmons |
| 2004/0238557 A1 | 12/2004 | Chirnomas |
| 2005/0189370 A1 | 9/2005 | Carter et al. |
| 2006/0196883 A1 | 9/2006 | Ward |
| 2007/0021866 A1 | 1/2007 | Coppola et al. |
| 2008/0009963 A1 | 1/2008 | Simmons |
| 2008/0021595 A1 | 1/2008 | Chirnomas |
| 2008/0061076 A1 | 3/2008 | Hieb et al. |
| 2008/0135574 A1 | 6/2008 | Hieb et al. |
| 2010/0025417 A1 | 2/2010 | Sjonell |
| 2010/0025422 A1 | 2/2010 | Bjornvall et al. |
| 2012/0116577 A1 | 5/2012 | Ottomanelli |
| 2012/0185086 A1 | 7/2012 | Khatchadourian et al. |
| 2014/0224826 A1 | 8/2014 | Otzen |
| 2015/0107463 A1 | 4/2015 | Lehman |
| 2016/0376102 A1 | 12/2016 | Cook, II et al. |
| 2017/0073159 A1 | 3/2017 | Lossov et al. |
| 2018/0174392 A1 | 6/2018 | Jafa et al. |
| 2018/0308308 A1 | 10/2018 | Castellano |
| 2019/0139353 A1 | 5/2019 | Barnum et al. |
| 2019/0272699 A1 | 9/2019 | Mohammed et al. |

OTHER PUBLICATIONS

Written Opinion (WO) For PCT/US2019/027894 dated Jul. 11, 2019 (6 pages).
International Preliminary Examination Report (IPER) and Written Opinion (WO) for PCT/US2019/027894 dated Oct. 29, 2019 (8 pages).
International Search Report (ISR) for PCT/US2019/027896 dated Aug. 27, 2019 (5 pages).
Written Opinion (WO) For PCT /US2019/027896 dated Aug. 27, 2019 (6 pages).
International Preliminary Examination Report (IPER) and Written Opinion (WO) for PCT/US2019/027896 dated Oct. 29, 2019 (8 pages).

* cited by examiner

VENDING MACHINE AND TRANSPORT CARTRIDGE SYSTEMS AND METHODS

TECHNICAL FIELD

The present invention relates generally to the field of vending machines for dispensing food items, and more particularly, to a vending machine for dispensing unpackaged food items loaded utilizing a transport cartridge adapted to be loaded off-site unpackaged food items and loaded on-site into the vending machine without any intermediate handling of the unpackaged food items.

BACKGROUND

Conventional vending machines for dispensing food items typically include a refrigeration component for preventing spoilage, a heating component for heating food items to a servable temperature, a food handler for transitioning food items within the machine, a dispenser for dispensing the food items, and a transaction component for processing payment.

Conventional vending machines for dispensing food items are typically stocked with factory prepared, pre-packaged foods items, and therefore are incapable of accommodating locally prepared unpackaged food items. Factory prepared food items, while often long-lasting, lack the freshness of locally prepared food and therefore are less desirable to a consumer. Further, vending machines stocked with factory prepared food items require package removal components for removing the food item from the packaging and/or protective film covering prior to heating, which adds cost and complexity to the vending machine, In an effort to improve food duality, vending machines have been developed that prepare and cook food items "on-demand" using pre-packaged ingredients. While these machines are an improvement in terms of freshness, there are inherent complexities and disadvantages associated with handling ingredients, complex food preparation, and time to prepare the food.

Therefore, to overcome the disadvantages of prior art vending machines for dispensing food items, what is needed is a vending machine configured to dispense locally prepared, unpackaged food items in an efficient and sanitary manner. Such a vending machine would provide local businesses an opportunity to expand locations, increase sales and automate food service, among other advantages.

SUMMARY

In one aspect, embodiments of the inventive concepts disclosed herein are directed to a vending machine system adapted to dispense unpackaged food and including a cabinet having a door for accessing a cabinet interior, a refrigerator disposed within the cabinet interior for storing unpackaged food, an oven disposed within the cabinet interior for heating unpackaged food to a servable temperature, at least one delivery chute for delivering heated unpackaged food, a payment system for processing customer payments, an interface for operating the vending machine system, a fixed cartridge disposed within the refrigerator, the fixed cartridge comprising a conveyor system for conveying trays of unpackaged food within the fixed cartridge, and a transport cartridge for loading trays of unpackaged food into the fixed cartridge, the transport cartridge adapted to removably attach to the fixed cartridge such that trays of unpackaged food in the transport cartridge are aligned with the conveyor system to transfer trays of unpackaged food from the transport cartridge to the conveyor system.

In another aspect, the fixed cartridge may include a housing having a front opening, a door, and a drive mechanism for driving the conveyor system.

In a further aspect, the transport cartridge may include a housing having a front opening, an interior rack for holding trays of unpackaged food, and a door covering the front opening of the housing.

In a further aspect, the transport cartridge may include a rotating dowel disposed adjacent a top of the housing on which the panel door is wound when retracting the panel door.

In a further aspect, at least a portion of a back wall of the housing of the transport cartridge may be movable in a direction of the front opening of the housing to simultaneously transfer trays of unpackaged food in the transport cartridge into the fixed cartridge.

In a further aspect, the vending machine system may further include a pusher for ejecting a tray of unpackaged food from within the fixed cartridge to a position exterior of the fixed cartridge.

In a further aspect, the fixed cartridge may include at least one alignment feature adapted to be received in a corresponding alignment receiver of the transport cartridge, and the transport cartridge may include at least one alignment feature adapted to be received in at least one alignment receiver disposed along a top of the fixed cartridge.

In a further aspect, the transport cartridge may include a removable back cover.

In a further aspect, the transport cartridge may be adapted to be loaded with unpackaged food at a location remote from the cabinet.

In another embodiment, the inventive concepts disclosed herein are directed to a system for loading and dispensing pre-baked unpackaged food including a fixed cartridge adapted to be disposed in a refrigerator of a vending machine, the fixed cartridge including a conveyor system for conveying trays of unpackaged food within the fixed cartridge, and a drive mechanism for driving the conveyor system, and a transport cartridge adapted to removably attach to the fixed cartridge, the transport cartridge including a housing, a rack for holding trays of unpackaged food, and a mechanism for transitioning the trays of unpackaged food from within the transport cartridge into the fixed cartridge, wherein, when the transport cartridge is removably attached to the fixed cartridge, a front opening of the transport cartridge aligns with a front opening of the fixed cartridge, and wherein the rack of the transport cartridge aligns with the conveyor system of the fixed cartridge such that trays of unpackaged food within the transport cartridge can simultaneously be transitioned from the rack to the conveyor system.

In a further aspect, a total tray capacity of the transport cartridge may be less than a total tray capacity of the fixed cartridge.

In a further embodiment, the inventive concepts disclosed herein are directed to a method for stocking a vending machine system/vending machine adapted to dispense unpackaged food, including the steps of providing a vending machine including a fixed cartridge disposed in a refrigerator of the vending machine, the fixed cartridge including a conveyor system for conveying trays of unpackaged food within the fixed cartridge, and a drive mechanism for driving the conveyor system, providing a transport cartridge adapted to removably attach to the fixed cartridge, the transport cartridge including a housing, a rack for holding trays of unpackaged food, and a mechanism for transitioning the trays of unpackaged food from within the transport cartridge into the fixed cartridge, stocking the transport cartridge with trays of unpackaged food at a location remote from a location of the vending machine, delivering the stocked transport cartridge to the location of the vending machine, attaching the stocked transport cartridge to the fixed cartridge such that a front opening of the transport cartridge aligns with a front opening of the fixed cartridge, and such that the rack of the transport cartridge aligns with the conveyor system of the fixed cartridge such, transferring trays of unpackaged food from the rack to the conveyor system, and detaching the transport cartridge from the fixed cartridge.

In another aspect, the method includes the further step of, subsequent to the step of attaching the transport cartridge to the fixed cartridge, retracting a door covering the front opening of the transport cartridge.

In a further aspect, the method includes the further step of, prior to the step of attaching the transport cartridge to the fixed cartridge, the steps of opening a vending machine door to access the refrigerator and opening a refrigerator door to access the fixed cartridge.

In a further aspect, the method includes the further step of attaching the transport cartridge to the fixed cartridge by engaging an alignment feature on the transport cartridge with an alignment receiver on the fixed cartridge.

In a further aspect, the step of transferring trays of unpackaged food from the rack to the conveyor system may include simultaneously transferring the trays.

In another aspect, disclosed herein is a vending machine system adapted to dispense unpackaged food, including: a cabinet comprising a door for accessing a cabinet interior; a refrigerator disposed within the cabinet interior; an oven disposed within the cabinet interior; at least one delivery chute for delivering heated unpackaged food; a payment system for processing customer payment; an interface for operating the vending machine system; a fixed cartridge disposed in the refrigerator, the fixed cartridge comprising a conveyor system for conveying trays of unpackaged food within the fixed cartridge; and a single tray loading device for loading individual trays of unpackaged food into the fixed cartridge one tray at a time, the single tray loading device adapted to removably attach to the fixed cartridge such that an individual tray of unpackaged food is aligned with the conveyor system to transfer the individual tray of unpackaged food from the single tray loading device into the conveyor system of the fixed cartridge.

In certain aspects, the fixed cartridge of the vending machine system disclosed immediately above includes a housing having a front opening; a door; and a drive mechanism operable for driving the conveyor system.

In certain aspects, the single tray loading device includes a plurality of interconnected sidewalls that define an internal cavity having: a first opening on a front side of the device for loading a tray and/or a temporary container having the tray therein, an internal flap (positioned within the single tray loading device) that is configured to selectively open and close when advancing the tray and/or temporary container having the tray therein through the single tray loading device, and a second opening configured to directly pass the tray from the single tray loading device into the conveyor of the fixed cartridge while retaining the temporary container therein. For example, in certain aspects, the second opening is configured to directly pass the tray from the single tray loading device into the conveyor of the fixed cartridge while concurrently retaining the temporary container therein such that the temporary container may be subsequently removed from the single tray loading device to allow for another tray to be loaded within the conveyor.

In certain aspects, the vending machine system disclosed above further includes a temporary container/tray guide configured for maneuvering a temporary cartridge and/or tray within the single tray loading device, the guide having a handle and spaced apart leading edge that are connected to one another by an elongate main body.

In another aspect, also disclosed is a method for stocking a vending machine adapted to dispense unpackaged food, comprising the steps of: providing a vending machine comprising a fixed cartridge disposed in a refrigerator of the vending machine, the fixed cartridge comprising a conveyor system for conveying trays of unpackaged food within the fixed cartridge, and a drive mechanism for driving the conveyor system; providing a single tray loading device adapted to removably attach to the fixed cartridge; providing trays of unpackaged food from a location that is remote of the vending machine, each tray being housed in a temporary container; providing a temporary container/tray guide configured for maneuvering a cartridge and/or tray within the single tray loading device; delivering the trays that are each housed in a temporary container to the location of the vending machine; attaching the single tray loading device to the fixed cartridge such that a front and back opening of the single tray loading device align with a single slot in a conveyor system of the fixed cartridge; loading a first temporary container containing a first tray with unpackaged food therein into the front opening of the single tray loading device; dislodging the first tray from the first temporary container and passing the first tray through the second opening of the single tray loading device into the corresponding slot in the conveyor system while retaining the first temporary container in the single tray loading device; conveying the first tray downward in the fixed cartridge such that a vacant slot in the conveyor system aligns with the single tray loading device; removing the first temporary container from the single tray loading device and proceeding with loading, dislodging, and conveying additional trays until a predetermined number of trays have been loaded into the fixed cartridge and/or until the fixed cartridge is fully loaded; detaching the single tray loading device from the fixed cartridge; closing the fixed cartridge, and configuring the vending machine for subsequent use. In certain aspects and after loading the first temporary container containing the first tray with unpackaged food therein into the front opening of the single tray loading device, the method includes advancing the first temporary container within the single tray loading device in a direction away from the first opening towards the second opening of the single tray loading device. In certain aspects, the method further includes contacting the temporary container containing the first tray with an internal flap positioned within the single tray loading device, with the internal flap being configured to dislodge the first tray from the first temporary container and retain the temporary container within the single tray loading device while selectively opening and closing to advance the tray into the corresponding slot in the conveyor system. In certain aspects and after loading the first temporary container containing the first tray with unpackaged food therein into the front opening of the single tray loading device, the method further includes contacting the first temporary container with a temporary container/tray guide to maneuver and advance the temporary cartridge within the single tray loading device towards the corresponding slot in the conveyor system. The temporary container/tray guide includes a handle spaced apart from a leading edge that are connected to one another by an elongate main body, the leading edge configured to contact and maneuver the temporary container containing the first tray with unpackaged food therein.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 14B is a detailed showing an exemplary alignment and engagement feature for removably attaching the transport cartridge to the fixed cartridge;

FIG. 16 is a back view of the single tray loading device having the internal flap in an open configuration thereby allowing for a tray to passed there through;

DETAILED DESCRIPTION

Figure 1:
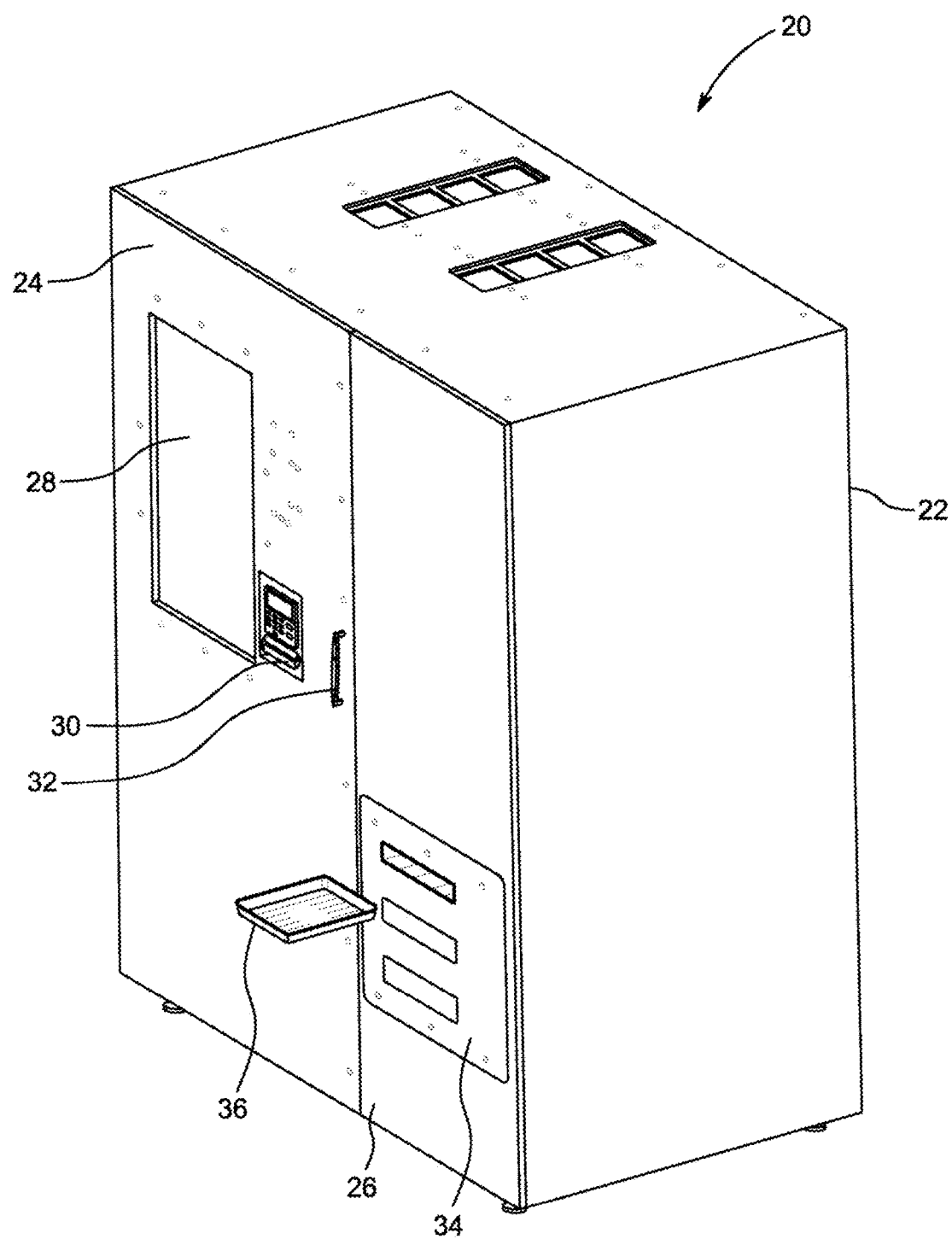
FIG. 1 is a front perspective view of a vending machine according to an embodiment of the invention.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments am provided so that this disclosure will be both thorough and complete, and will fully convey the scope of the invention and enable one of ordinary skill in the art to make, use and practice the invention. Like reference numbers refer to like elements throughout the various drawings.

The inventive concepts disclosed herein are generally directed vending machines for dispensing fresh, unpackaged food items. In an exemplary embodiment, the vending machine may be an automated kiosk configured to dispense fresh, pre-baked pizza slices to customers. The vending machine generally includes a temperature-controlled refrigeration unit for storing pre-baked pizza slices, and a high-performance electric conveyor oven for heating the pizza slices on-demand to a servable temperature. The pizza slices may be delivered utilizing one or more of pushers, sliders, elevators and conveyors, and an exit chute for delivery. In exemplary capacities, the vending machine may hold up to 72 or 108 fresh pizza slices. The vending machine may further include a touchscreen display, optionally a camera to capture images of customers interacting with the vending machine, and a payment subsystem operable to accept credit card payments as well as near field communication (NFC) payment, examples of which include, but are not limited to, Apple Pay™, Google Wallet™ and Softcard™. The vending machine may be configured with multiple delivery chutes to deliver pizza slices at a servable temperature. The vending machine may utilize a power subsystem for the creation and distribution of AC and DC voltages derived from 240 VAC and 60 Amps.

In one aspect, the inventive concepts disclosed herein are directed to a method for loading or stocking pre-baked unpackaged pizza slices or other food items into the refrigeration unit, and may include the steps of: (1) optionally powering down the vending machine; (2) accessing and opening the refrigerator door and removing all expired/unsold pizza slices; (3) removing the transport protective covering where applicable; (4) attaching the transport cartridge to the fixed cartridge disposed in the refrigerator; (5) opening the door of the fixed cartridge where applicable; (6) opening the door of the transport cartridge; (7) transferring, for example by pushing, the trays of pizza slices from the transport cartridge into the fixed cartridge; (8) closing the door of the fixed cartridge where applicable; (9) detaching the transport cartridge from the fixed cartridge; (10) lowering the predetermined number of trays down to the bottom of the fixed cartridge; and (11) repeating steps (3)-(10) to load trays of pizza slices until each fixed cartridge is at a desired or full capacity.

In another aspect, the inventive concepts disclosed herein are further directed to a method for ordering a pizza slice utilizing the touchscreen, the method including the steps of: (1) activating the touchscreen and selecting a flavor of pizza slice; (2) determining the availability of the selected flavor of pizza slice; (3) upon confirmation of availability prompting payment, and upon confirmation of unavailability reverting back to slice flavor selection; (4) requiring payment; (5) selecting an offered mode of payment; (6) calculating and confirming payment; (6) pizza slice processing; (7) transitioning the pizza slice from the refrigerator to the conveyor; (8) conveying the pizza slice to the oven; (9) displaying live processing and estimated time remaining for delivery (e.g., 2 minutes 30 seconds from the start of processing to delivery); (10) heating the pizza slice; (11) conveying the heated pizza slice to a predetermined delivery chute; (12) displaying to the customer a prompt to collect the heated pizza slice from the predetermined delivery chute; and (13) collecting the pizza slice from the predetermined delivery chute.

To achieve the above objects and aspects, FIG. 1 illustrates a vending machine adapted to dispense pre-baked unpackaged food generally at reference numeral 20. The vending machine 20 includes a cabinet 22 having a main door 24 and a service door 26. The main door 24 is opened to access at least the internal refrigerator; as well as various other internal components for servicing. A touchscreen user interface 28 may be mounted within the main door 24. The touchscreen user interface 28 may be a capacitance or resistive touchscreen operable for inputting customer selections, displaying information, programming the vending machine, etc. Adjacent the touchscreen user interface is a payment subsystem 30 including card reader functionality and near field communication readability, among other functionality. The main door 24 may be equipped with a handle and lock 32 operable for accessing the interior of the vending machine. The vending machine 20 further includes a delivery chute subassembly 34 for dispensing food trays 36 to customers. The vending machine 20 may include additional features such as leveling feet and rolling casters. The exterior can be branded or otherwise customized for each different owner/operator.

The touchscreen user interface 28 and the payment subsystem 30 may be communicatively coupled and may include a digital computer that, in terms of hardware architecture, generally includes a processor, input/output (I/O) interfaces, a network interface, a data store, and memory. A processor/controller may control the touchscreen, inventory management, and payment subsystems, among other components. It should be appreciated by those of ordinary skill in the art that a practical embodiment of a computer may include additional components and suitably configured processing logic to support known or conventional operating features that are not described in detail herein. The components may be communicatively coupled via a local interface. The local interface may be, for example but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The controller/processor may be a hardware device for executing software instructions. The controller/processor may be any custom made or commercially available processor, a central processing unit (CPU), an auxiliary processor among several processors associated with the server, or generally any device for executing software instructions. The controller/processor may be configured to execute software stored within the memory, to communicate data to and from the memory, and to generally control operations of the server pursuant to the software instructions. The I/O interfaces may be used to receive user input from and/or for providing system output to one or more system devices or components. User input may be provided via, for example, the touchscreen. System output may also be provided via the touchscreen. I/O interfaces may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface may be used to enable the server to communicate on a network, such as the Internet, a wide area network (WAN), a local area network (LAN), and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. The memory may have a distributed architecture where various components are accessed by the controller/processor. The software in memory may include one or more software programs, each of which includes an ordered listing of executable instructions for implementing logical functions. The software in the memory may include a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

Figure 2:
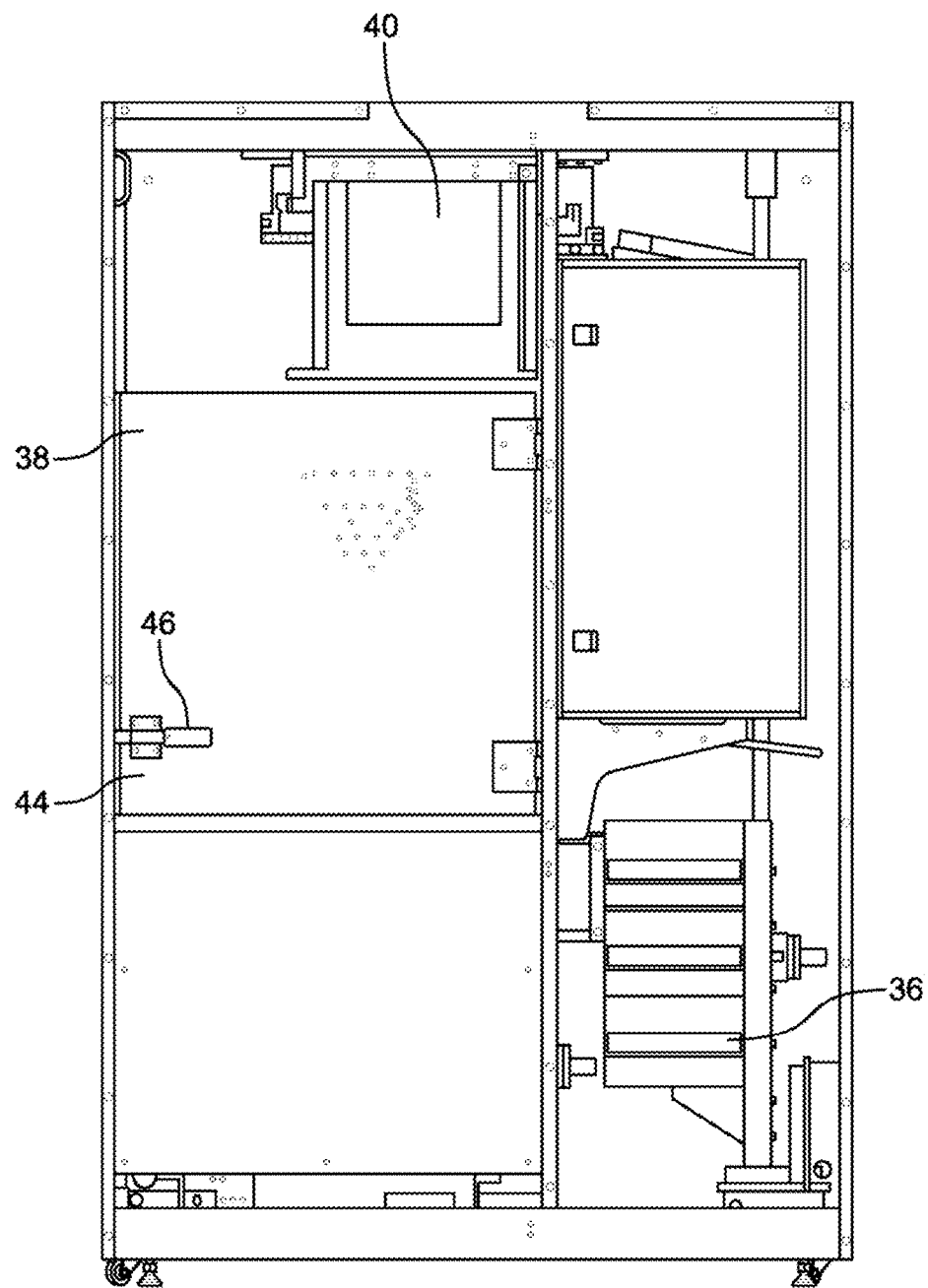
FIG. 2 is a front view of the vending machine, showing the front door or doors removed.
Figure 3:
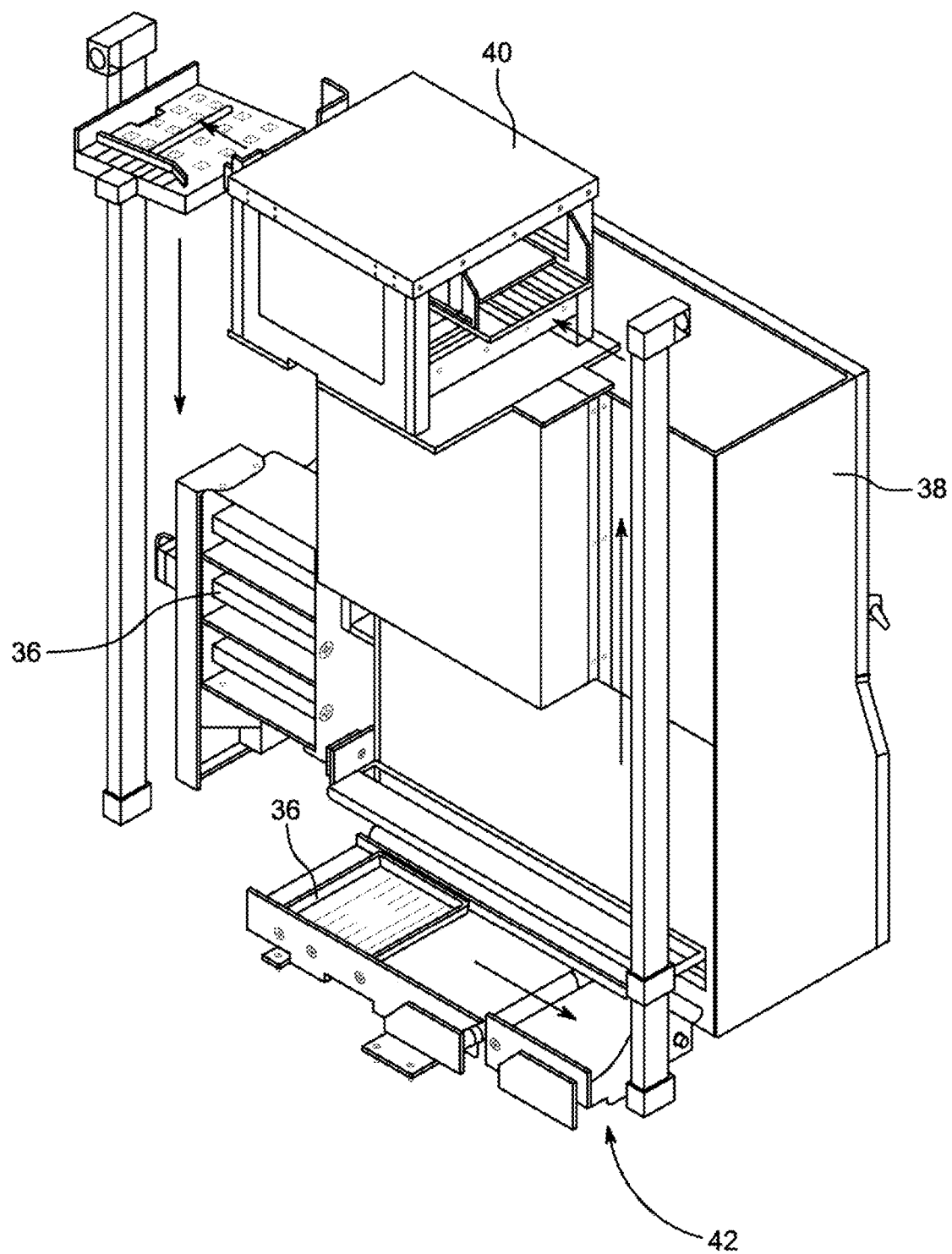
FIG. 3 is a perspective view of the internal components of the vending machine, shown removed from the vending machine.

Referring to FIGS. 2 and 3, the internal components of the vending machine 20 generally include, but are not limited to, a refrigerator 38, a conveyor oven 40, and an arrangement of elevators, pushers, conveyors, etc. 42 for transitioning the trays 36 within the machine. The refrigerator door 44 may be equipped with a handle 46 for manipulating the main door. The vending machine 20 can include additional components including, but not limited to, thermal ducting, fans/blowers, power supplies, cabling, lighting, and insulation. Referring specifically to FIG. 3, the directional arrows indicate an exemplary tray conveyance pathway within the machine from the refrigerator to the conveyor to the exit chute.

Figure 4:
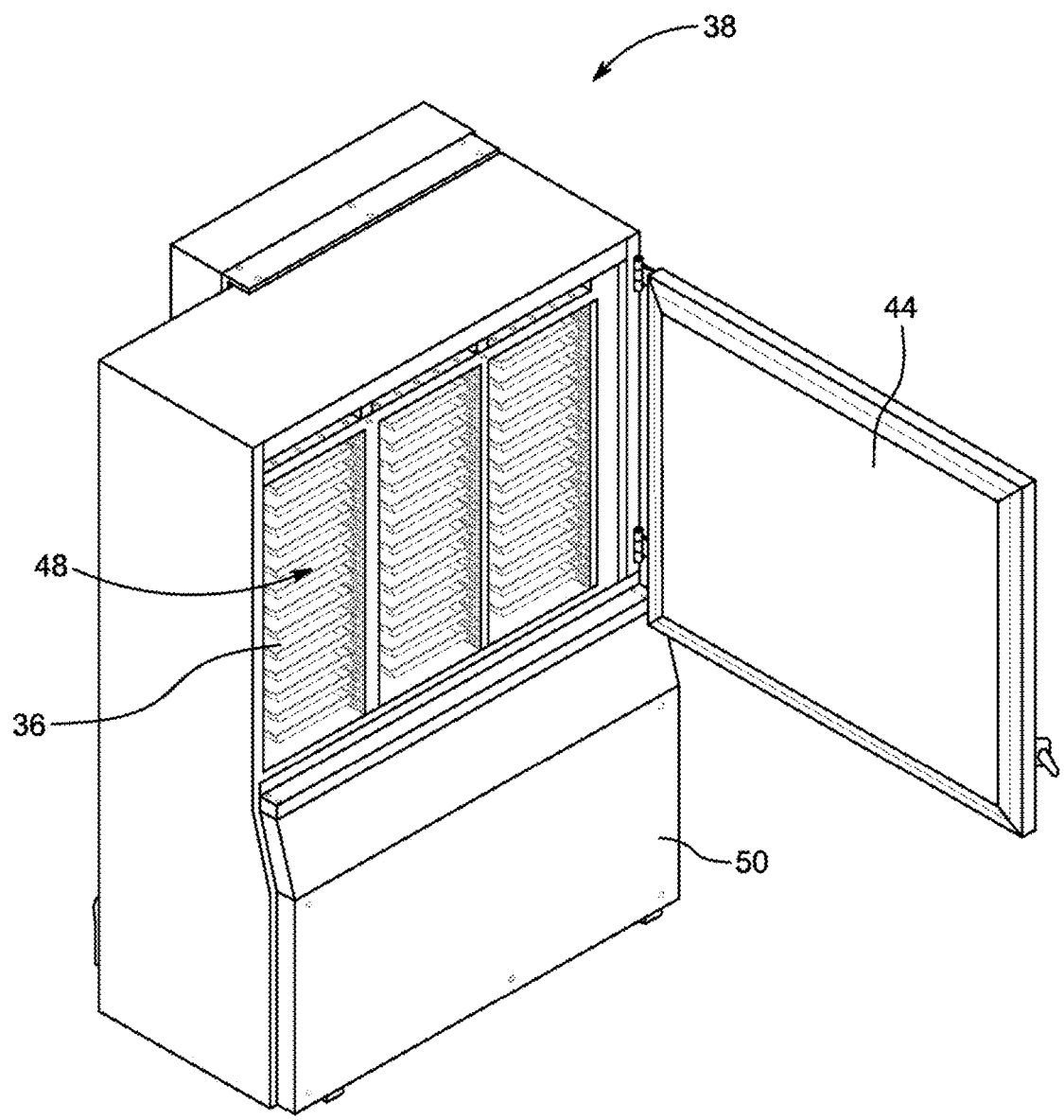
FIG. 4 is a perspective view of the refrigerator, showing the main refrigerator door open and internal fixed cartridges.

Referring to FIG. 4, an exemplary embodiment of a refrigerator is shown generally at reference numeral 38. Aside from conventional componentry such as a heat pump and thermal insulation, the refrigerator 38 includes the main door 44 opened to access the refrigerator interior compartment. Housed within the refrigerator interior component is at least one fixed cartridge 48. As discussed in detail below, each fixed cartridge 48 is generally operable for receiving and storing vertically-stacked trays 36 of unpackaged food and conveying the trays 36 within the fixed cartridge to an exit of the fixed cartridge on demand. As shown, the fixed cartridge configuration includes three fixed cartridges 48 in a side-by-side arrangement with each having a predetermined tray-holding capacity. In a non-limiting example, the refrigerator houses two fixed cartridges each accommodating 36 trays of unpackaged food, for a total fixed machine tray capacity of 72 trays of unpackaged food. The fixed cartridges 48 are arranged side-by-side with a front opening of each fixed cartridge oriented facing the main door 44 such that the front opening of each fixed cartridge is accessible when the main door 44 is open. The refrigerator may further include a secondary door 50 for accessing other areas of the fixed cartridges and/or conveyor driving mechanisms associated with the fixed cartridges.

Figure 5:
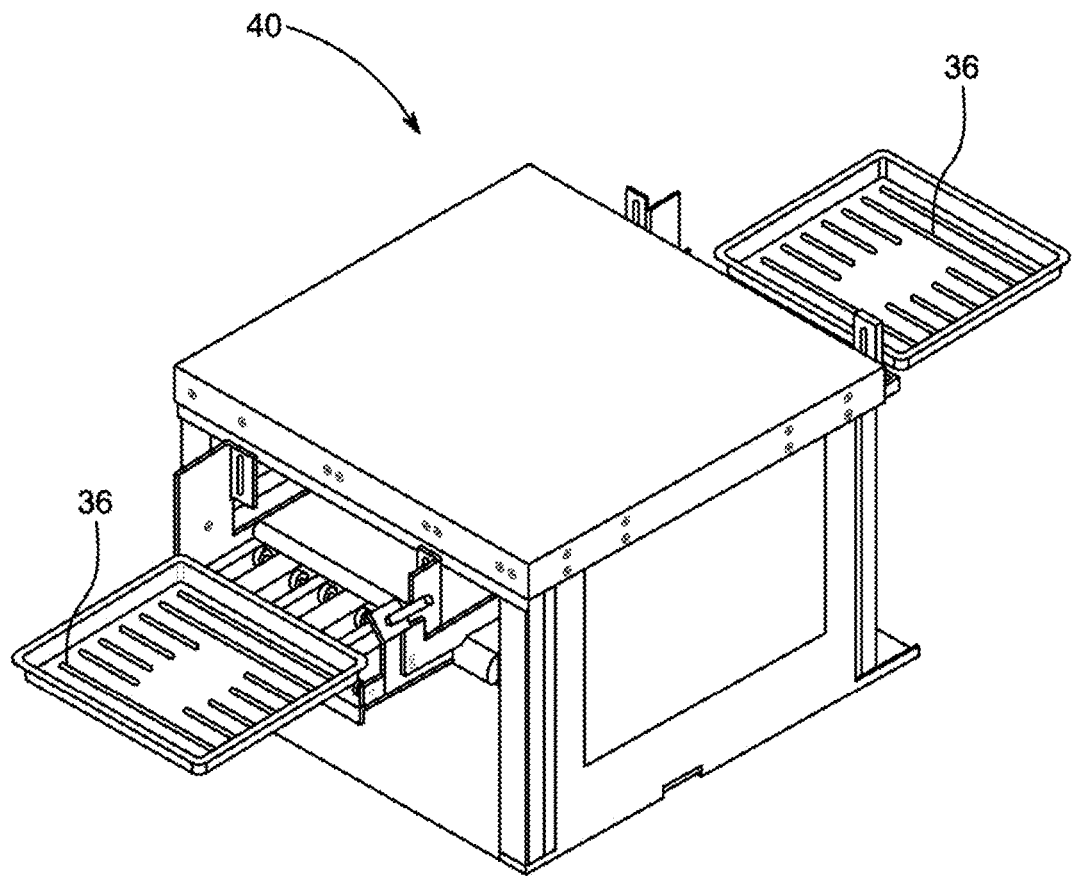
FIG. 5 is a perspective view of a conveyor oven.

Referring to FIG. 5, an exemplary high-performance electric conveyor oven for heating the unpackaged food on-demand to a servable temperature is shown generally at reference numeral 40. Trays 36 holding unpackaged food, for example a single pizza slice, are conveyed from the refrigerator to the conveyor oven, where the unpackaged food is heated to the predetermined servable temperature before being conveyed to the exit chute subassembly. The unpackaged food may be heated and served on the same tray as delivered to the vending machine or may be heated on another tray or without a tray.

Figure 6:
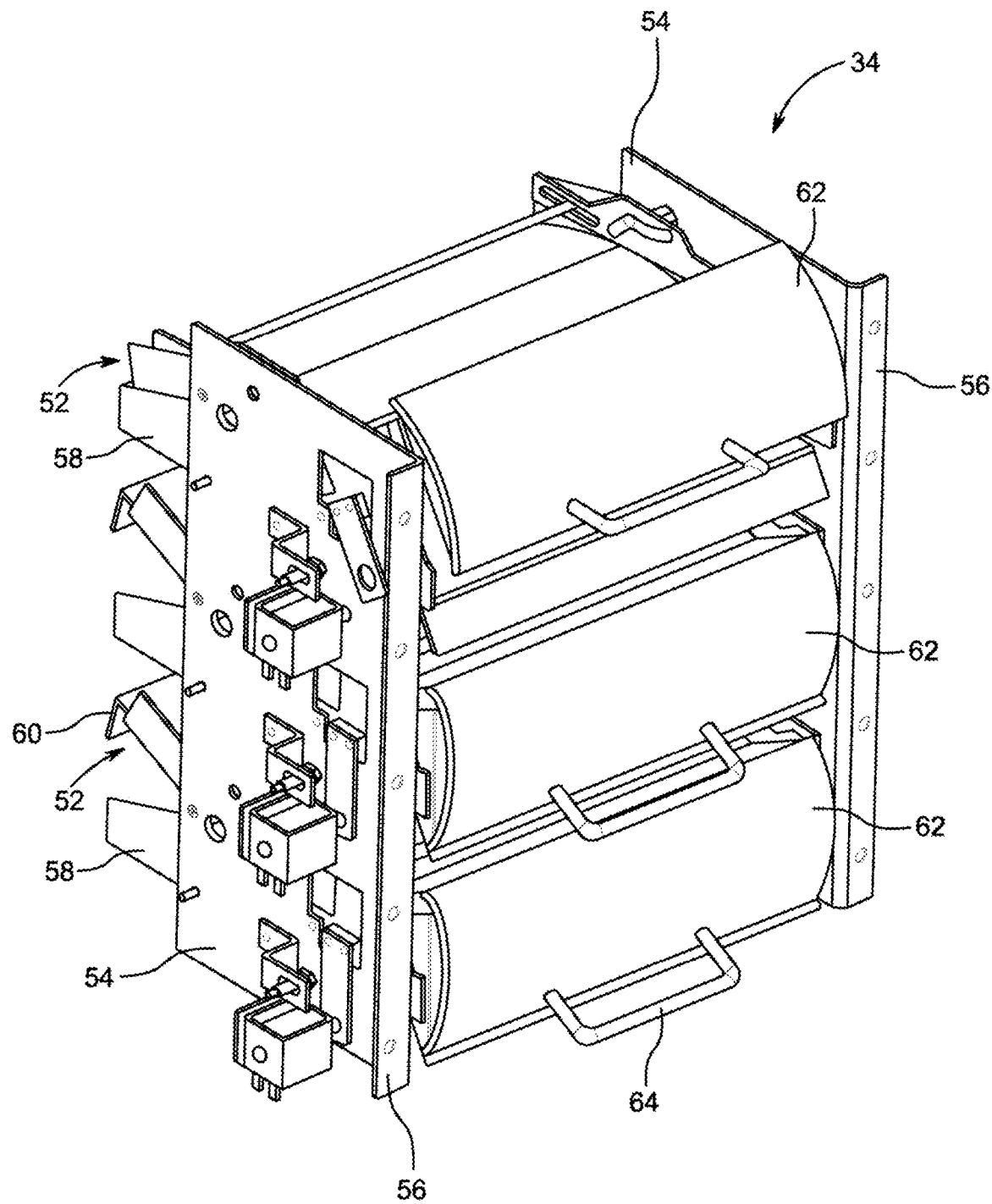
FIG. 6 is a front perspective view of a food dispensing chute assembly.
Figure 7:
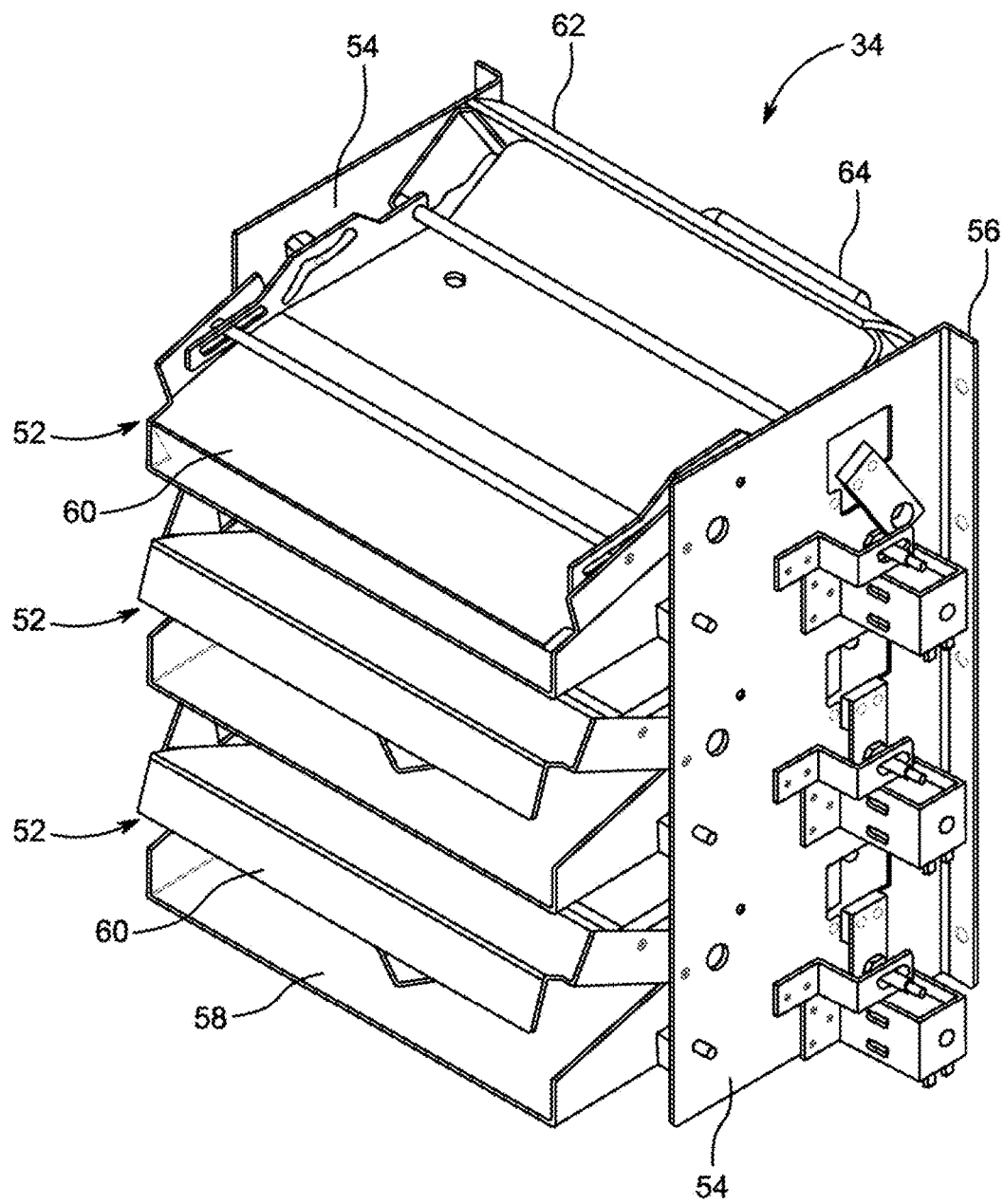
FIG. 7 is a rear perspective view of the food dispensing chute assembly.

Referring to FIGS. 6 and 7, an exemplary dispensing chute subassembly is shown generally at reference numeral 34. The dispensing chute subassembly 34 generally includes a plurality of chutes 52 each operable for dispensing heated unpackaged food served on the tray. The chutes 52 are mounted between a pair of parallel sidewalls 54 each having a front flange 56 adapted to mount to the inside face of the cabinet. Each chute 52 generally includes a shelf 58 upon which the trayed unpackaged food is placed for delivery, a shelf cover 60 movable relative to the shelf, and a delivery door 62 operably connected to the shelf cover 60. In operation, when the delivery door 62 is closed, the shelf cover 60 is lifted above the shelf 58 such that a tray handler has access to the shelf from the backside as illustrated in the bottom two chutes 52. When the delivery door 62 is opened, the shelf cover 60 closes on the shelf 58 such that the customer has access to the food item on the shelf while prevented from reaching beyond the shelf into the machine, as illustrated in the top chute 52. Thus, the delivery door 62 is operatively linked to the shelf cover 60 such that delivery door movement drives shelf cover movement. As such, the customer is unable to reach into the inside of the machine regardless of whether the shelf 58 is loaded or unloaded. Each delivery door 62 can be equipped with a handle 64 for manually opening and closing the delivery door.

Figure 8:
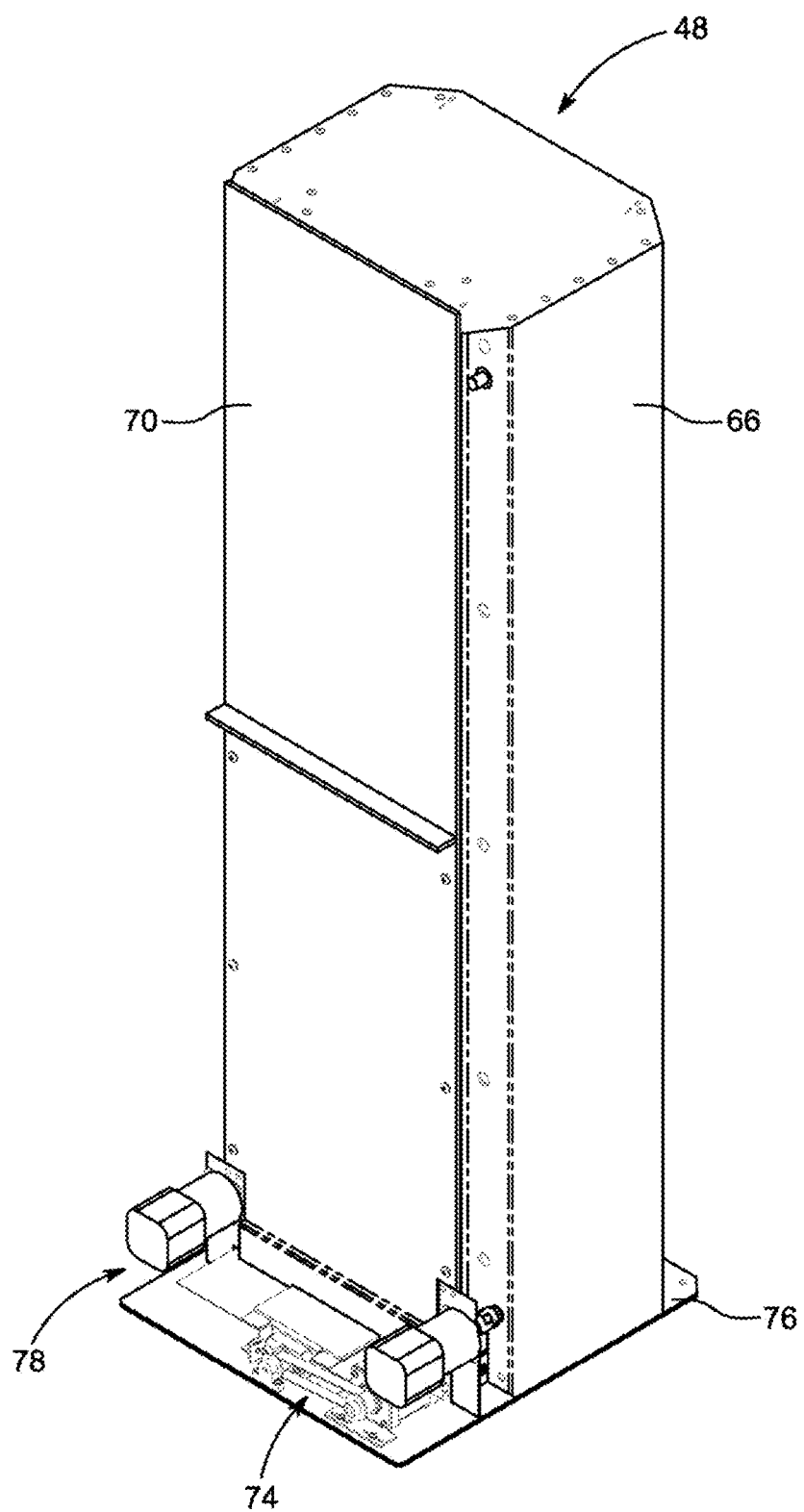
FIG. 8 is a front perspective view of a fixed cartridge.
Figure 9:
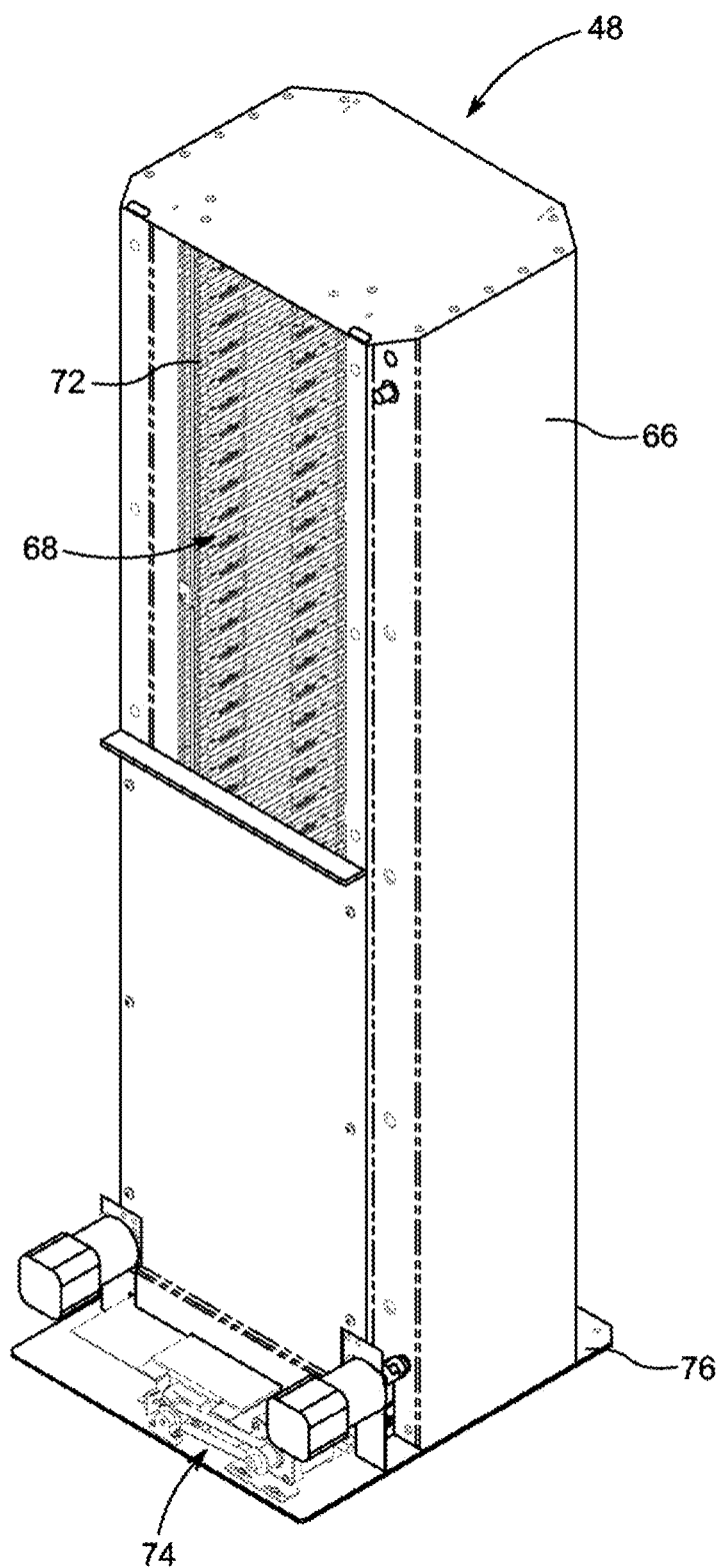
FIG. 9 is a front perspective view of the fixed cartridge, showing the front door removed.
Figure 10:
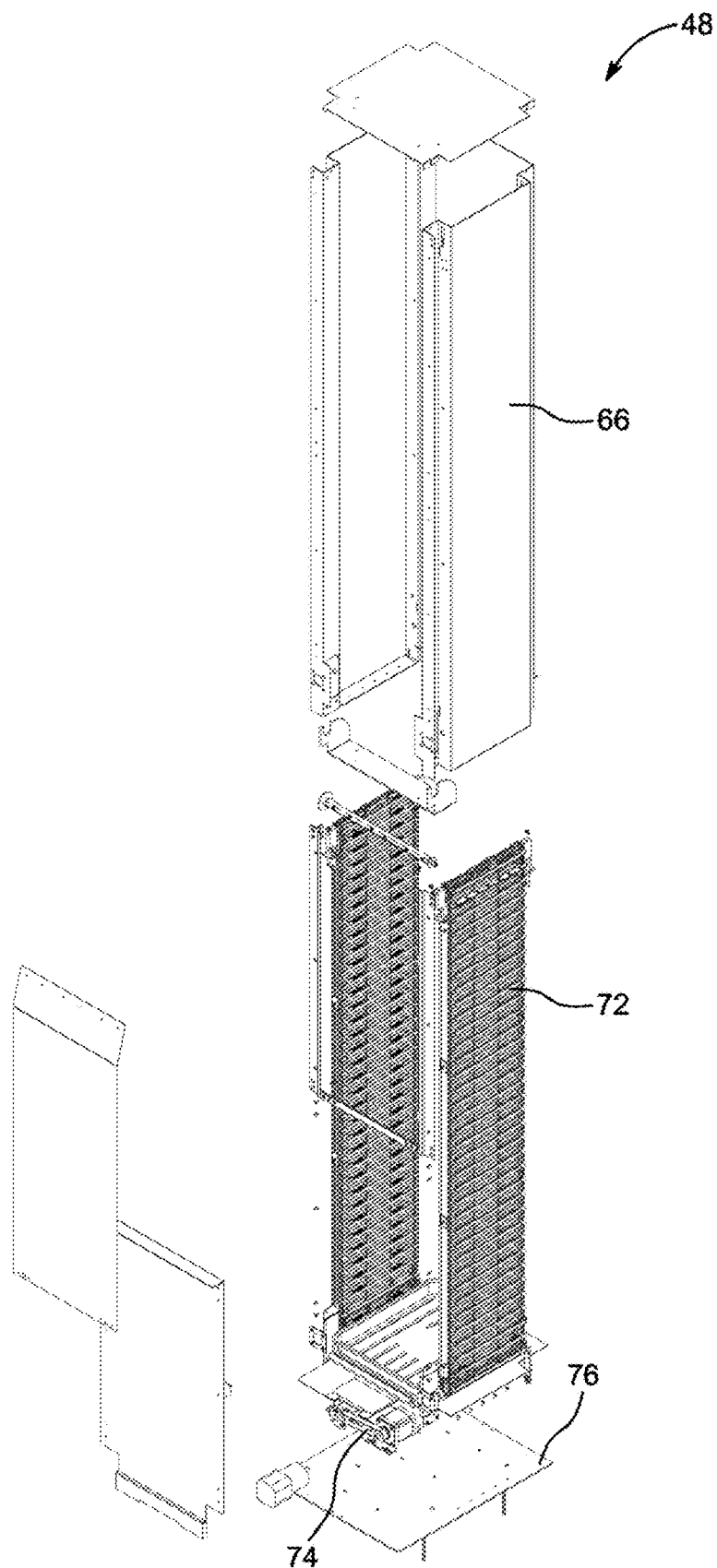
FIG. 10 is an exploded view of the fixed cartridge.

Referring to FIGS. 8-10, an exemplary fixed cartridge is shown generally at reference numeral 48. Each cartridge 48 is housed within the refrigerator and generally includes a housing 66 having a front opening 68, at least one door 70, a conveyor system 72, and a drive mechanism 74 for driving the conveyor system. The housing 66 may be mounted on a base 76 adapted to be secured to the refrigerator floor. The drive mechanism drives conveyor movement to convey trays of unpackaged food within the fixed cartridge, for example, in a direction toward the bottom of the fixed cartridge. Conveyor belts, chains, or the like may be symmetrically arranged on opposite sides of the interior and cooperate to stably transition a tray toward the bottom of the fixed cartridge to an exit where a pusher 78 operates to transition a tray from within the fixed cartridge to a position outside of the fixed cartridge, for example, to be conveyed to the conveyor oven.

Figure 11:
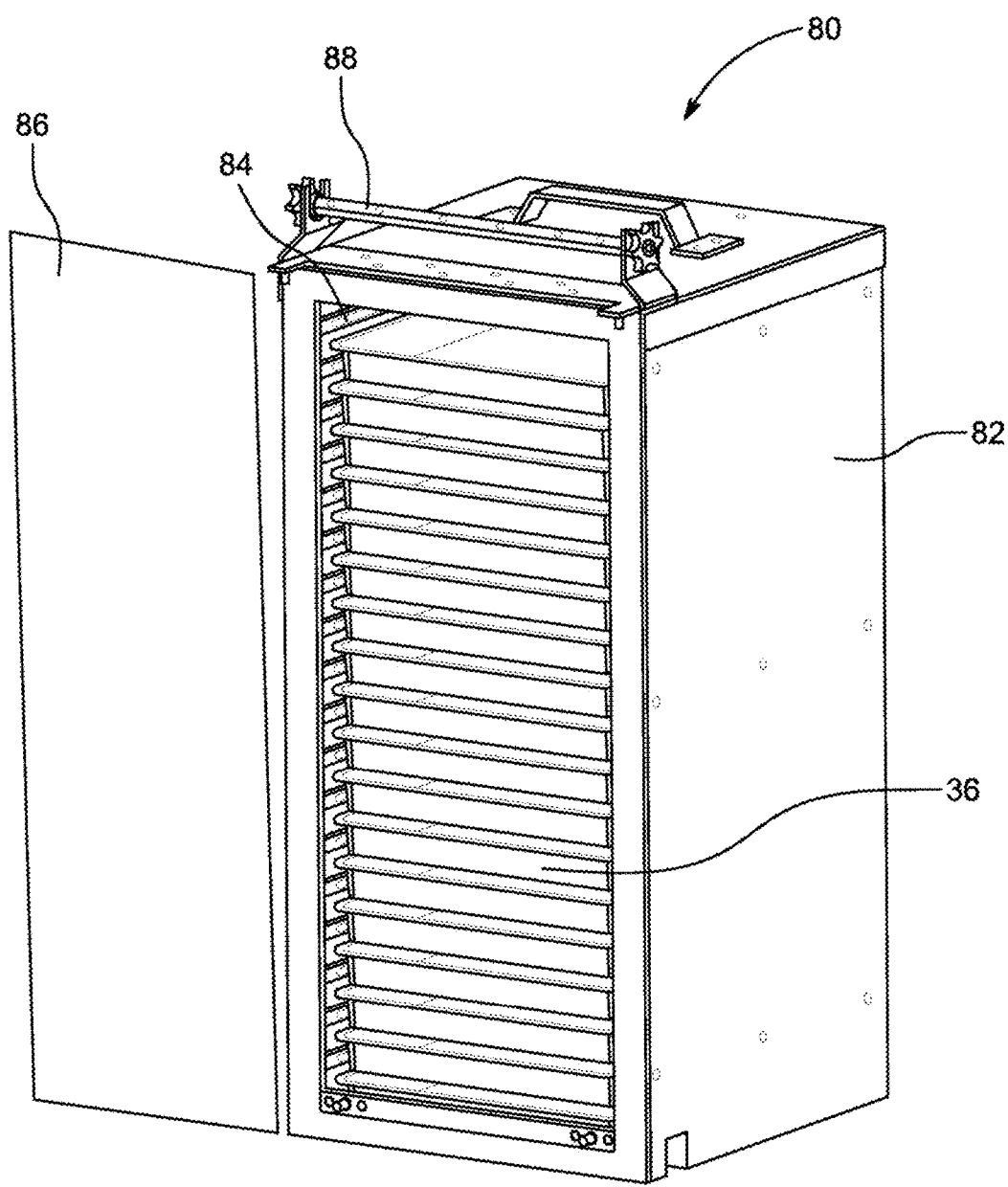
FIG. 11 is front perspective view of a transport cartridge, showing the front door removed.
Figure 12:
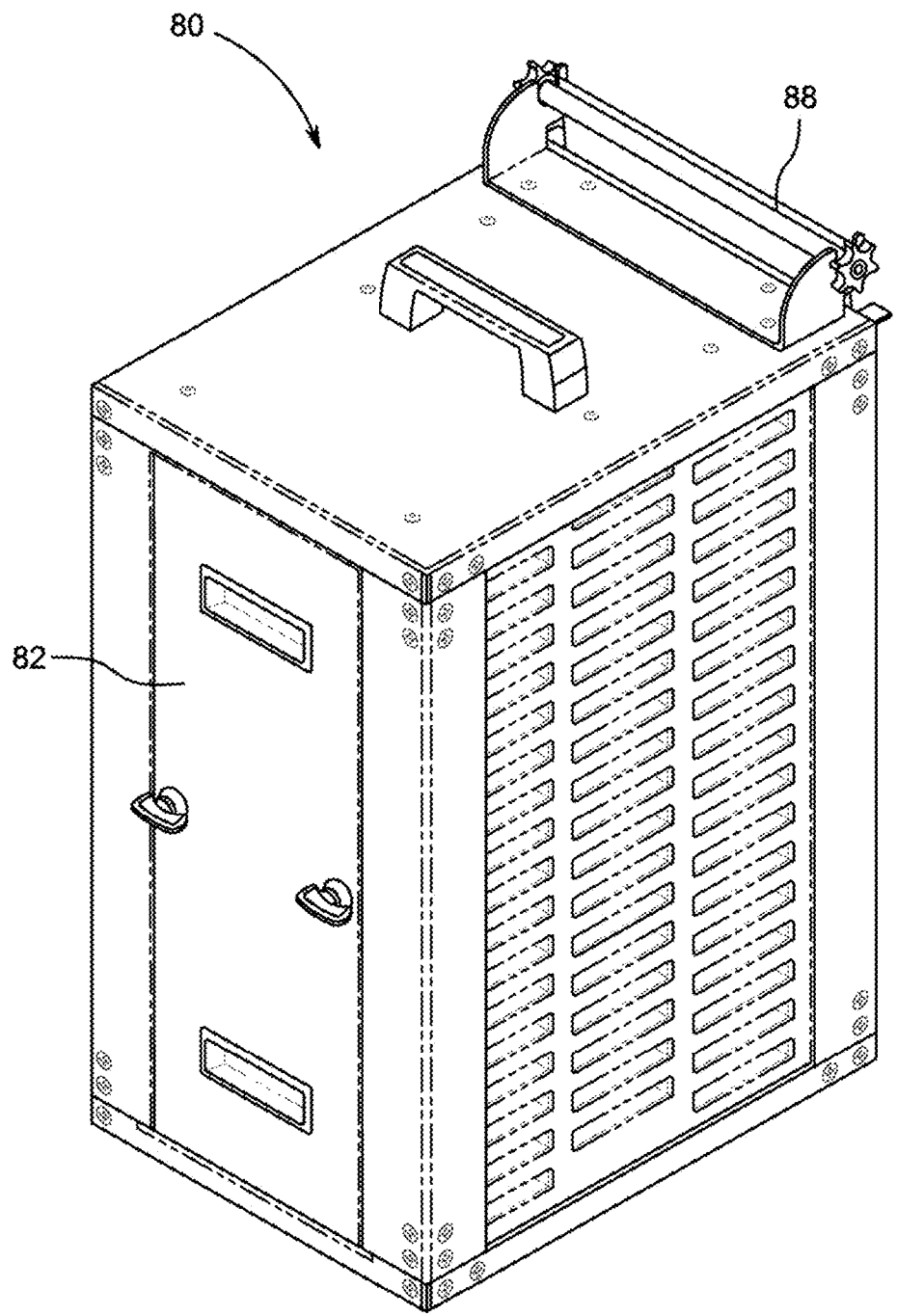
FIG. 12 is a rear perspective view of the transport cartridge.
Figure 13:
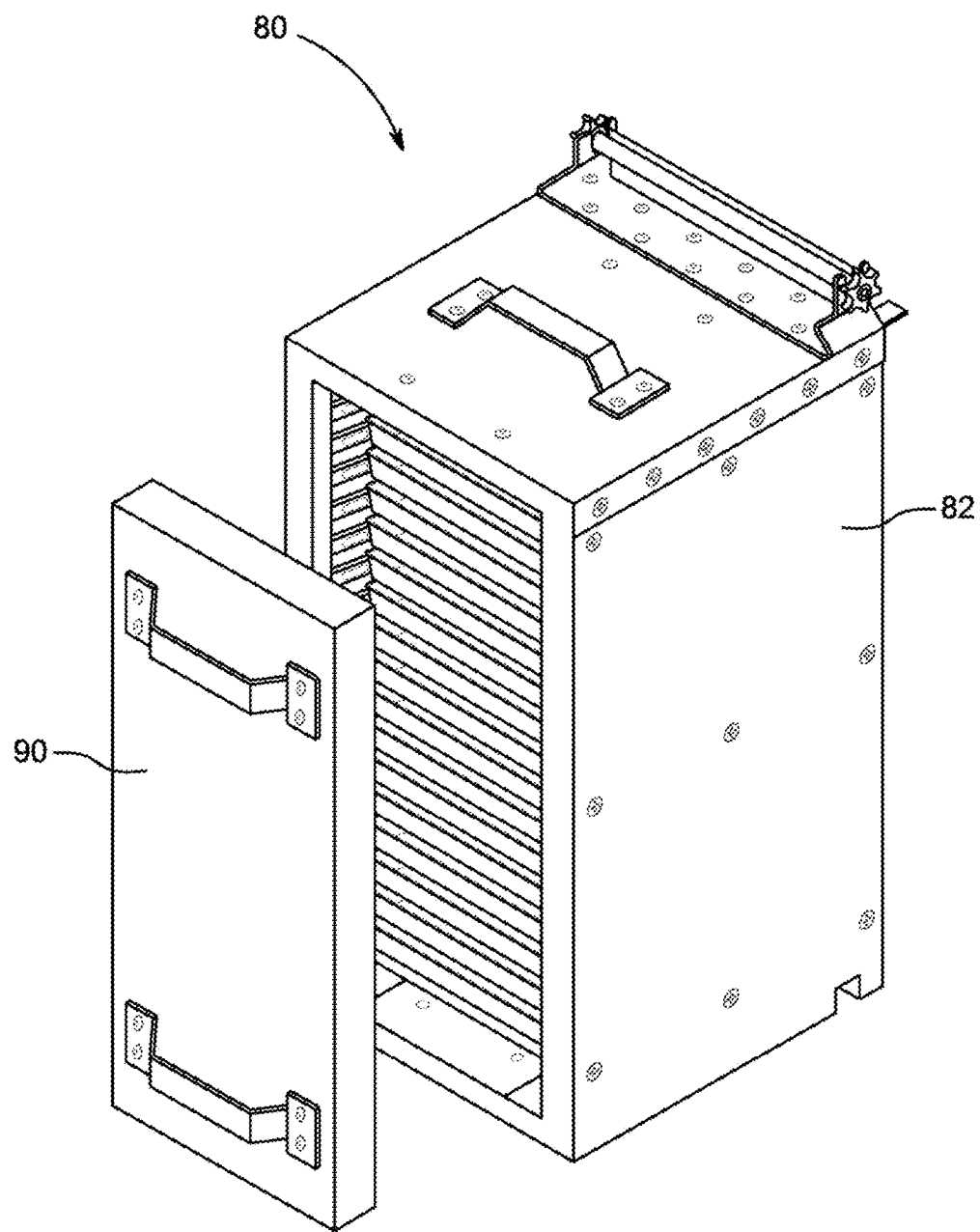
FIG. 13 is a rear perspective view of the transport cartridge, showing the back cover removed.

Referring to FIGS. 11-13, embodiments of transport cartridges are shown generally at reference numeral 80. The transport cartridge 80 generally operates to load or stock trays of unpackaged food into the fixed cartridge. The transport cartridge 80 is adapted to removably attach to the fixed cartridge such that trays of unpackaged food in the transport cartridge are aligned with the conveyor system to transfer the trays of unpackaged food from the transport cartridge into the fixed cartridge. The transport cartridge 80 generally includes a housing 82 having a front opening, an interior rack 84 for holding trays 36 of unpackaged food in a vertical stack, and a door 86 (shown removed) for covering the front opening of the housing. The door 86 can slide to one side to or can be a panel door that winds around a rotating dowel 88 disposed on top of the housing.

Referring specifically to FIG. 13, at least a portion of a back wall 90 of the housing of the transport cartridge 80 may be removable and/or movable in a direction of the front opening of the housing to simultaneously transfer trays of unpackaged food from the transport cartridge into the fixed cartridge when attached thereto.

Figure 14A:
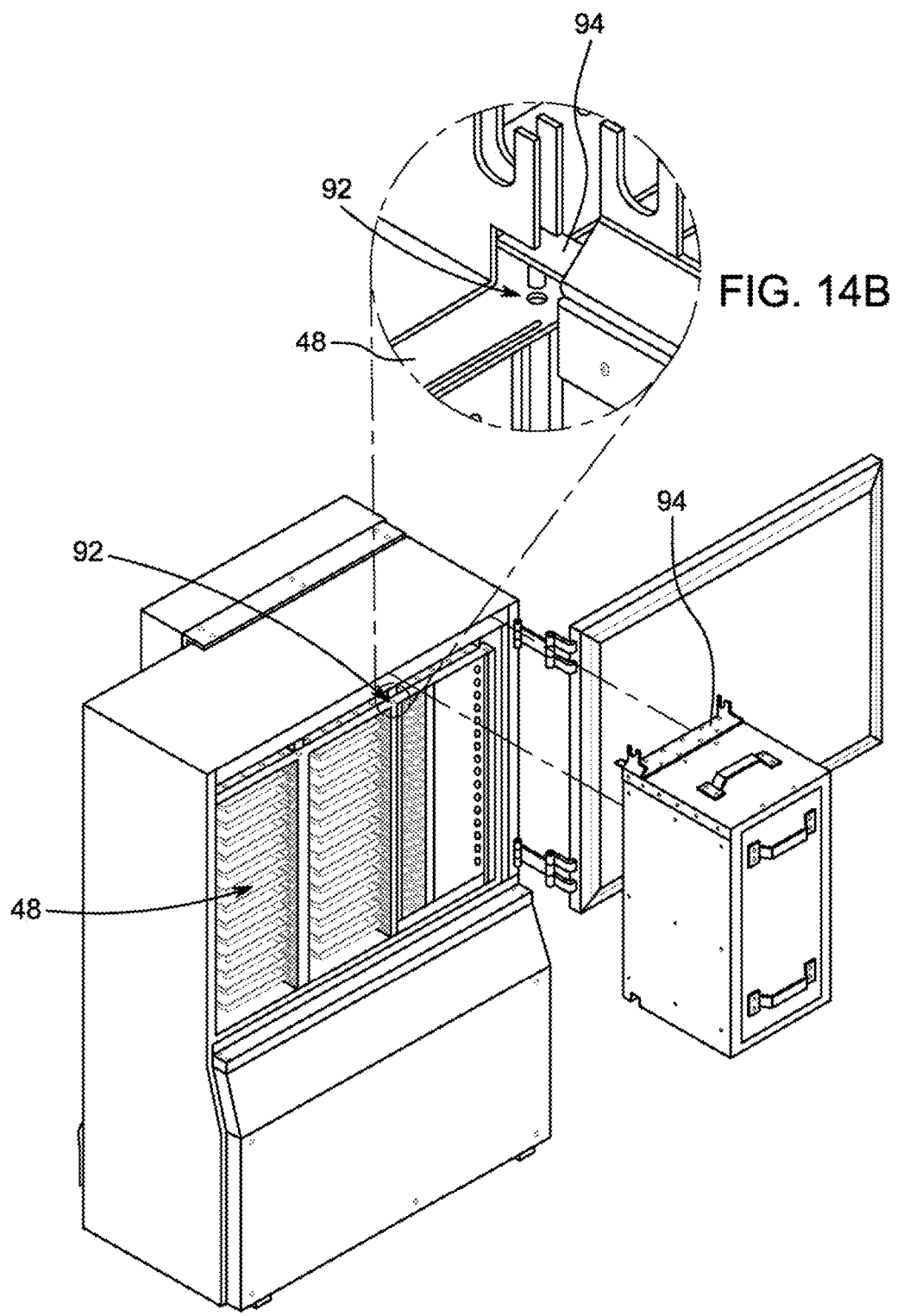
FIG. 14A is a perspective view showing the transport cartridge aligned to be removably attached to the fixed cartridge.

Referring to FIGS. 14A and 14B, the fixed cartridge 48 may include at least one alignment receiver 92 adapted to receive a corresponding alignment feature 94 on the transport cartridge 80 and/or the transport cartridge may include at least one alignment receiver adapted to receive a corresponding alignment feature on the fixed cartridge. A primary function of the alignment feature(s) and receiver(s) being to align and removably attach the transport cartridge to the fixed cartridge to align the openings in facing contact.

The transport cartridge is adapted to be loaded with unpackaged food at a location remote from the vending machine. For example, the vending machine system allows a local restaurant or food item supplier to operate and stock the vending machine. The transport cartridges are configured to be removed from the vending machine, and therefore can be washed and loaded at the restaurant under sanitary conditions as the food is made, closed and sealed for transport to the vending machine, and installed within the vending machine by interfacing with the fixed cartridges, thereby eliminating any intermediate handling of the food items. In an exemplary configuration, the vending machine is configured to sell pizza by the splice. A local pizzeria can put the machine into service anywhere as a convenience to customers. The pizza can be made at the pizzeria and loaded into the transport cartridges. The transport cartridges are transported in a dosed sanitary condition to the vending machine, where the trays are loaded into the fixed cartridges without any intermediate food handling.

Food items suitable for use with the present invention include any unpackaged food item having any size or shape. The trays and cartridges can be customized based on the food item to be dispensed. The term "unpackaged" as used herein can mean lacking any form of sealed or unsealed container or protective film. A suitable conveyor oven for use with the present invention provides high-volume processing and generally includes a cooking tunnel having an entrance and exit, a thermal heating source, and conveyor means. The conveyor means may be a continuous open link conveyor belt operable for transporting the food items thru the cooking tunnel. Conveyor belt speed can be customized to adjust cooking time based on the capacity of the thermal heating source, the food items to be heated, the starting temperature of the food items, etc.

In certain aspects and in further view of FIGS. 12-14B (discussed above), simultaneously loading a plurality of trays into the fixed cartridge 48 via transport cartridge 80 may be overly cumbersome and disfavored due to overall size and weight of the transport cartridge 80. Thus, in certain aspects, an alternative embodiment may be provided for loading individual trays 36, one at a time, within the fixed cartridge 48.

FIGS. 15A-19B specifically depict the individual components of this alternative embodiment including a single tray loading device 180, temporary container/tray guide 300, and temporary container 400 containing an individual tray 36 therein. It should be noted that the other components of the vending machine 20 (e.g., conveyor system 72, fixed cartridge, etc.) are present and operate in a substantially similar manner as discussed above. Thus, this embodiment merely provides an alternative for loading the machines 20 as disclosed further herein.

FIGS. 15A-15E depict a top, bottom, side, front, and back views respectively of the single tray loading device 180. As further shown in these Figures, the single tray loading device 180 is formed of a plurality of interconnected sidewalls 182, 183, 184, 185. Specifically in view of FIG. 15D, top sidewall 182 is connected to right side wall 183, which is connected to bottom sidewall 184, which is connected to left side wall 185 when viewed from the front of device 180. As further shown in FIGS. 15D and 15E, the plurality of sidewalls 182, 183, 184, 185 define an internal cavity having an opening 187 (or inlet) on a front side of the a device for loading a temporary container 400 therein, an internal flap 189 that is configured to selectively open and close, and a second opening 188 (or outlet) that has sufficient clearance to pass a tray 36 (temporarily housed within temporary container 400) through the single tray loading device into the fixed cartridge 48. As further shown in FIG. 16, internal flap 189 rotates about axis $A^1$ away from the bottom sidewall 184 towards the top sidewall 182 such that opening 187 (inlet) and second opening 188 (or outlet) may be in temporary fluid communication when internal flap is contacted and biased in this manner about axis $A^1$ while passing a tray 36 there through. After passing the tray 36 there through, the internal flap rotates back to a closed position.

Figure 15A:
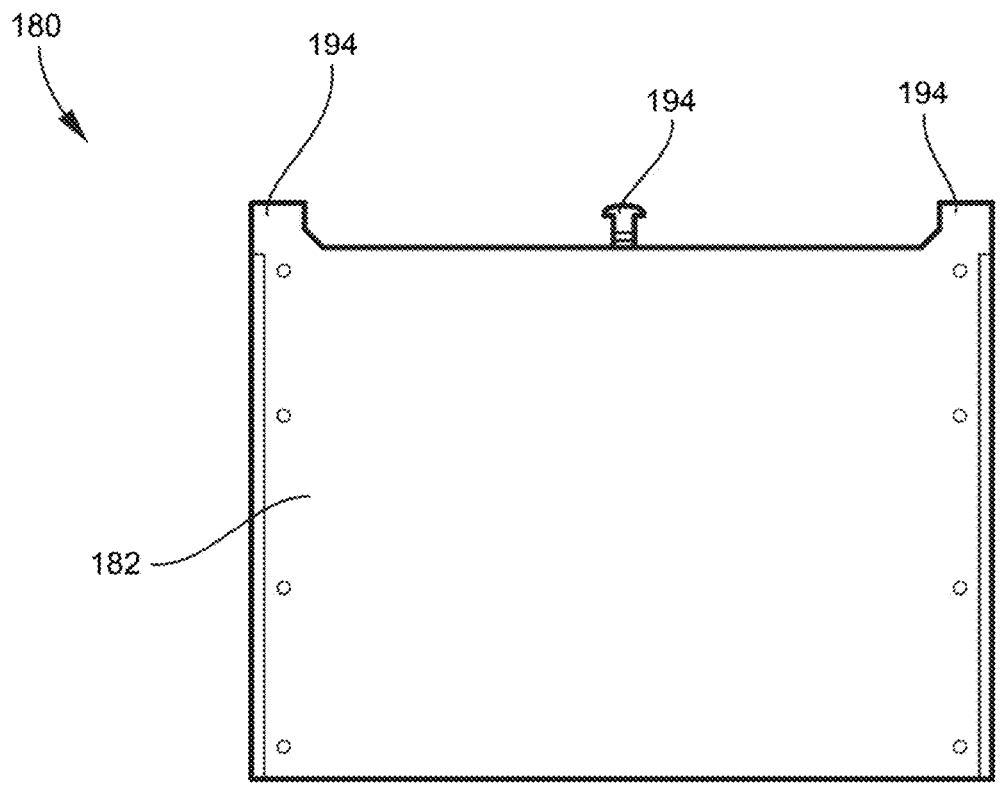
FIG. 15A is a top view of the single tray loading device.
Figure 15B:
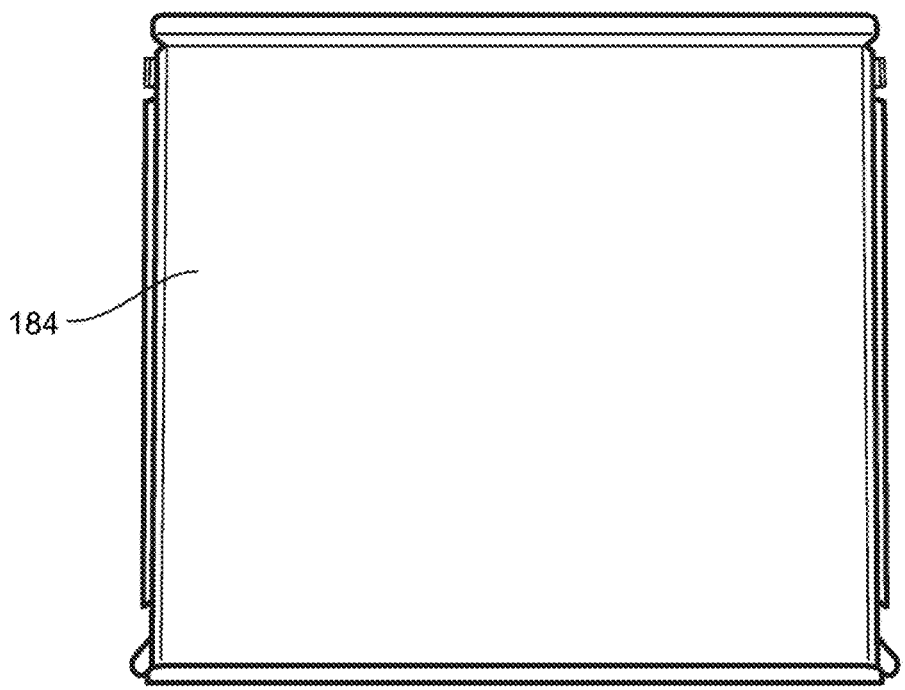
FIG. 15B is a bottom view of the single tray loading device.
Figure 15C:
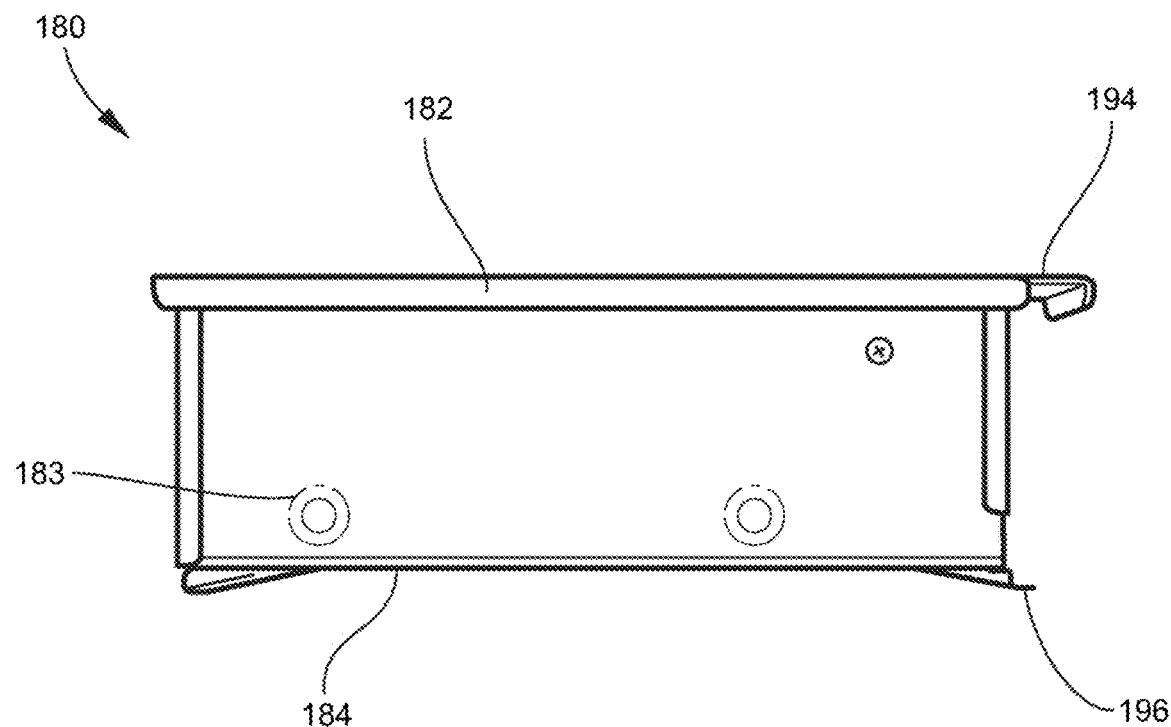
FIG. 15C is a side view of the single tray loading device.
Figure 15D:
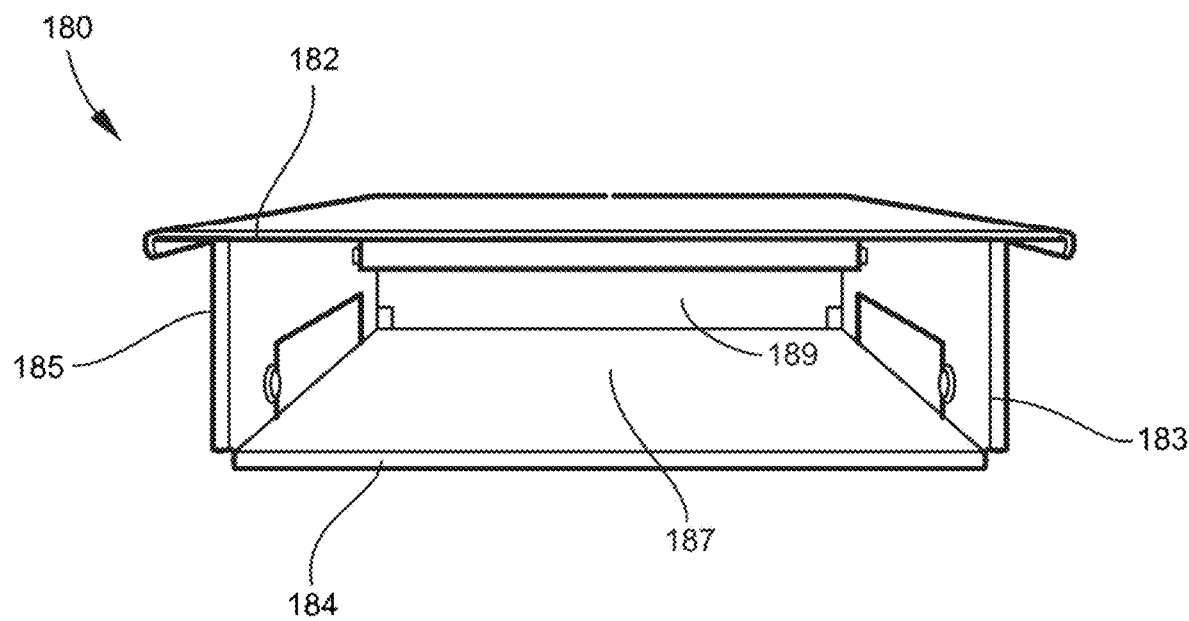
FIG. 15D is a front view of the single tray loading device.
Figure 15E:
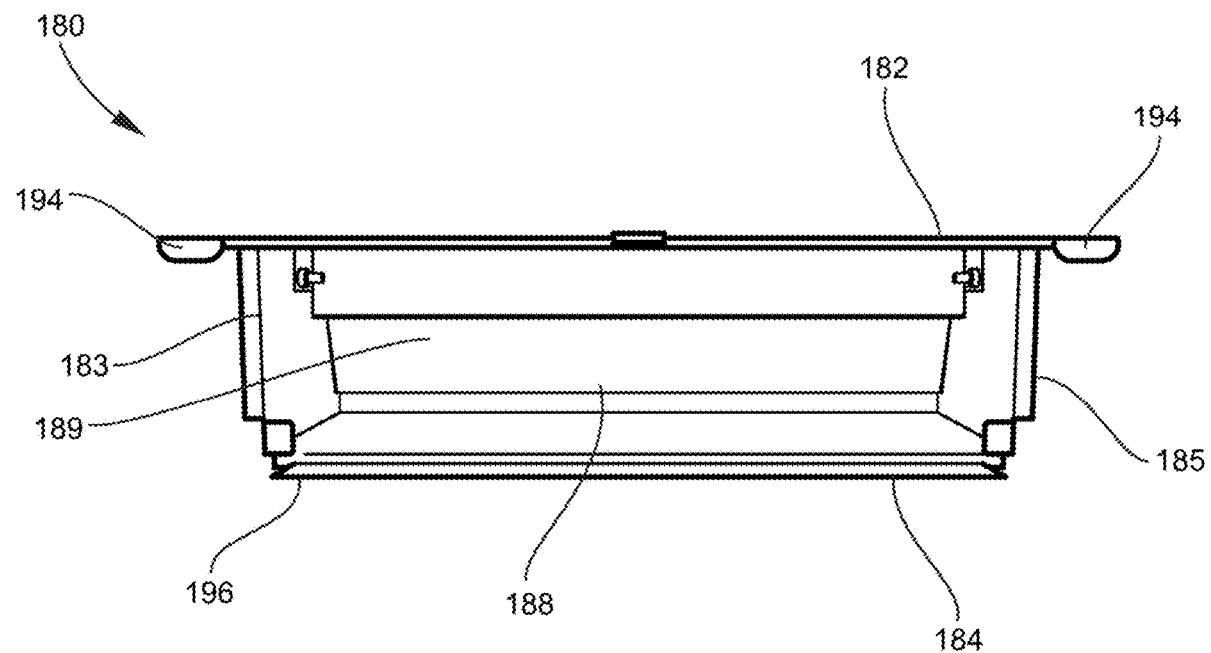
FIG. 15E is a back view of the single tray loading device.
Figure 16:
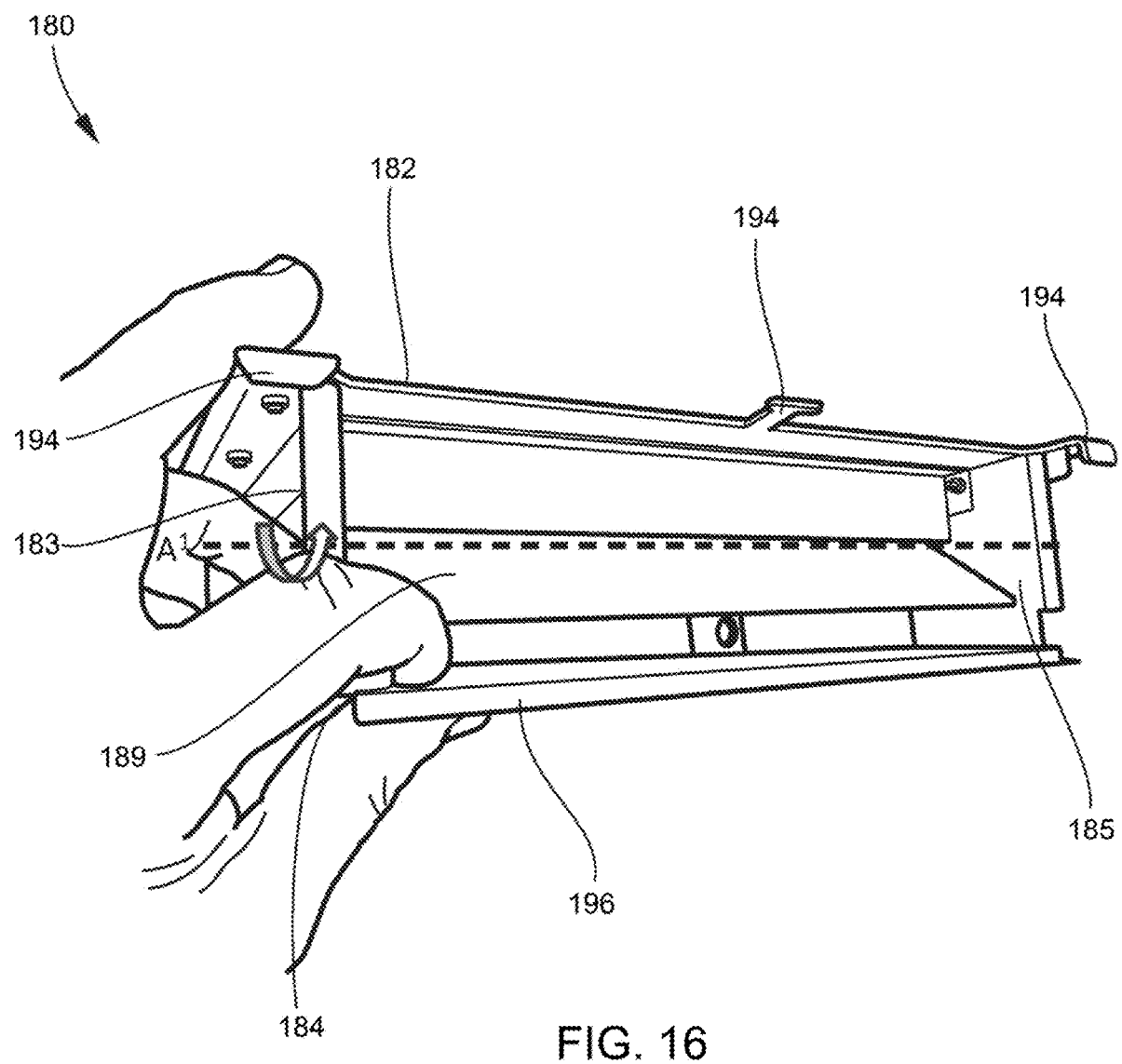

In further view of FIGS. 15A, 15C, 15E, the single tray loading device 180 includes alignment feature 194 (tabs) positioned on and extending away from top sidewall 182. The alignment feature 194 (tabs) is configured to be inserted within and securely engage alignment receiver 92 on an outer surface of the fixed cartridge 48. FIGS. 15C and 15E further show lip 196 positioned on and extending away from bottom sidewall 184. The lip 196 is configured to rest against an outer surface of fixed cartridge 48 when the single tray loading device 180 is securely engaged with the fixed cartridge 48.

Figure 17A:
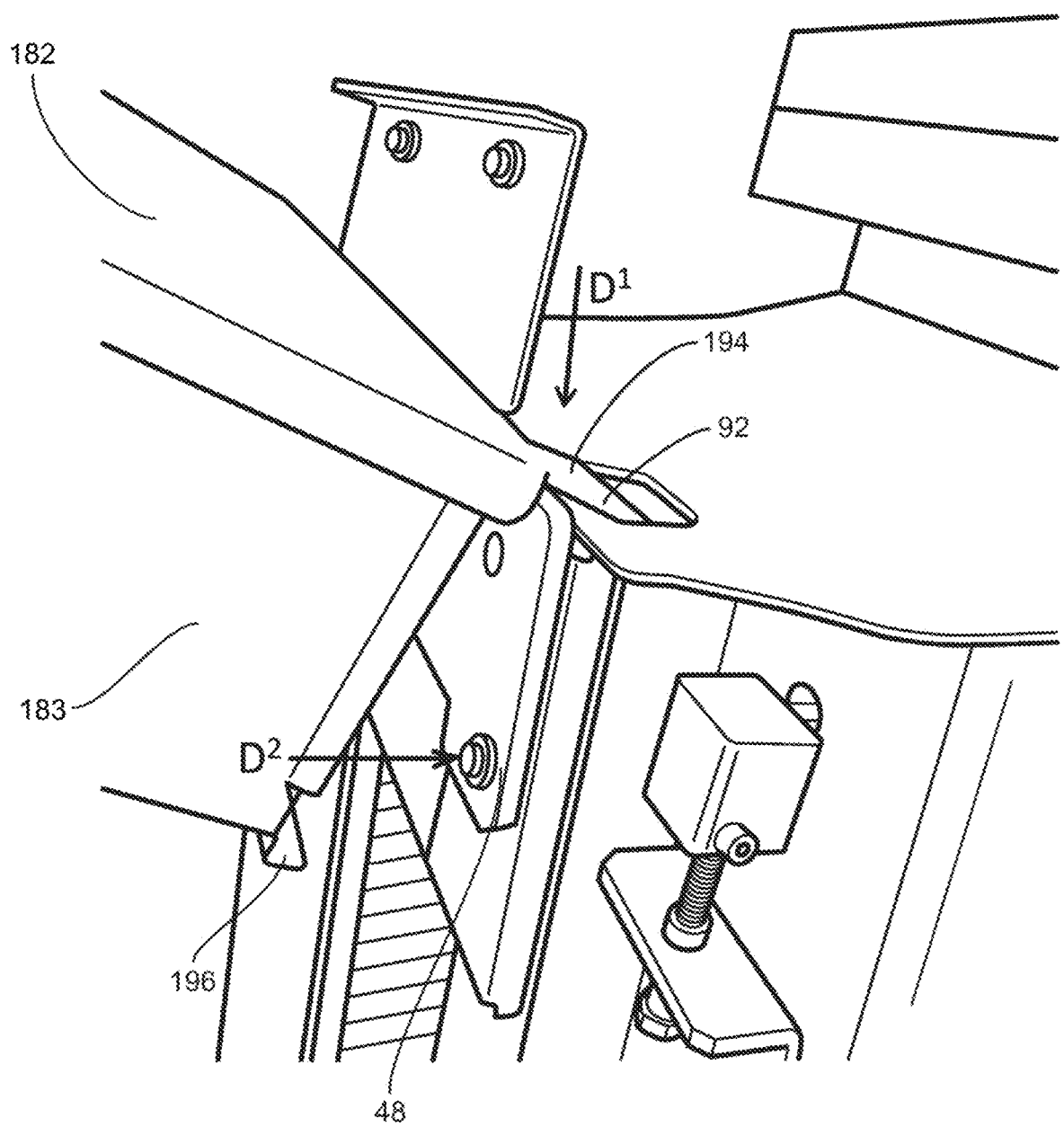
FIG. 17A shows a magnified view of the single tray loading device being aligned and partially engaged with the vending machine.
Figure 17B:
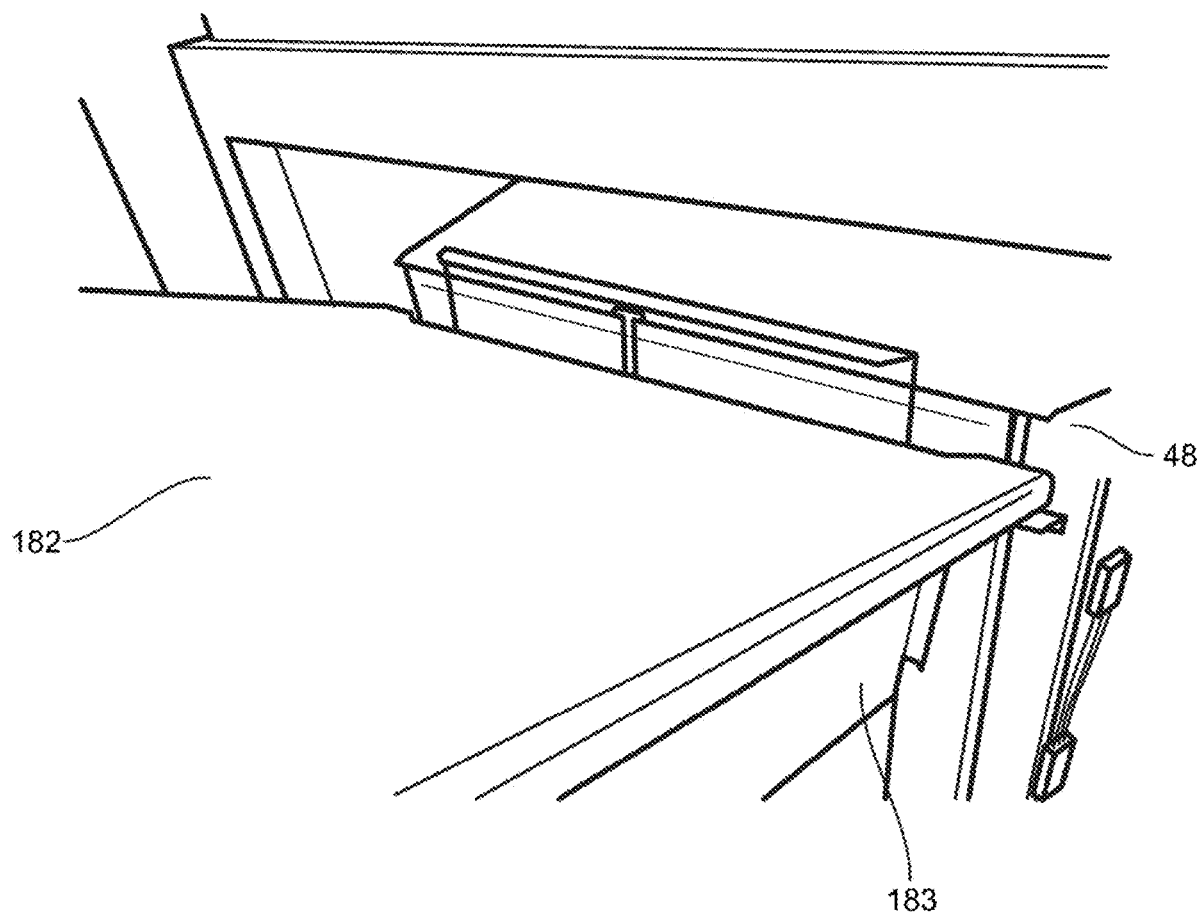
FIG. 17B shows a second magnified view of the single tray loading device being fully engaged with the vending machine.
Figure 17C:
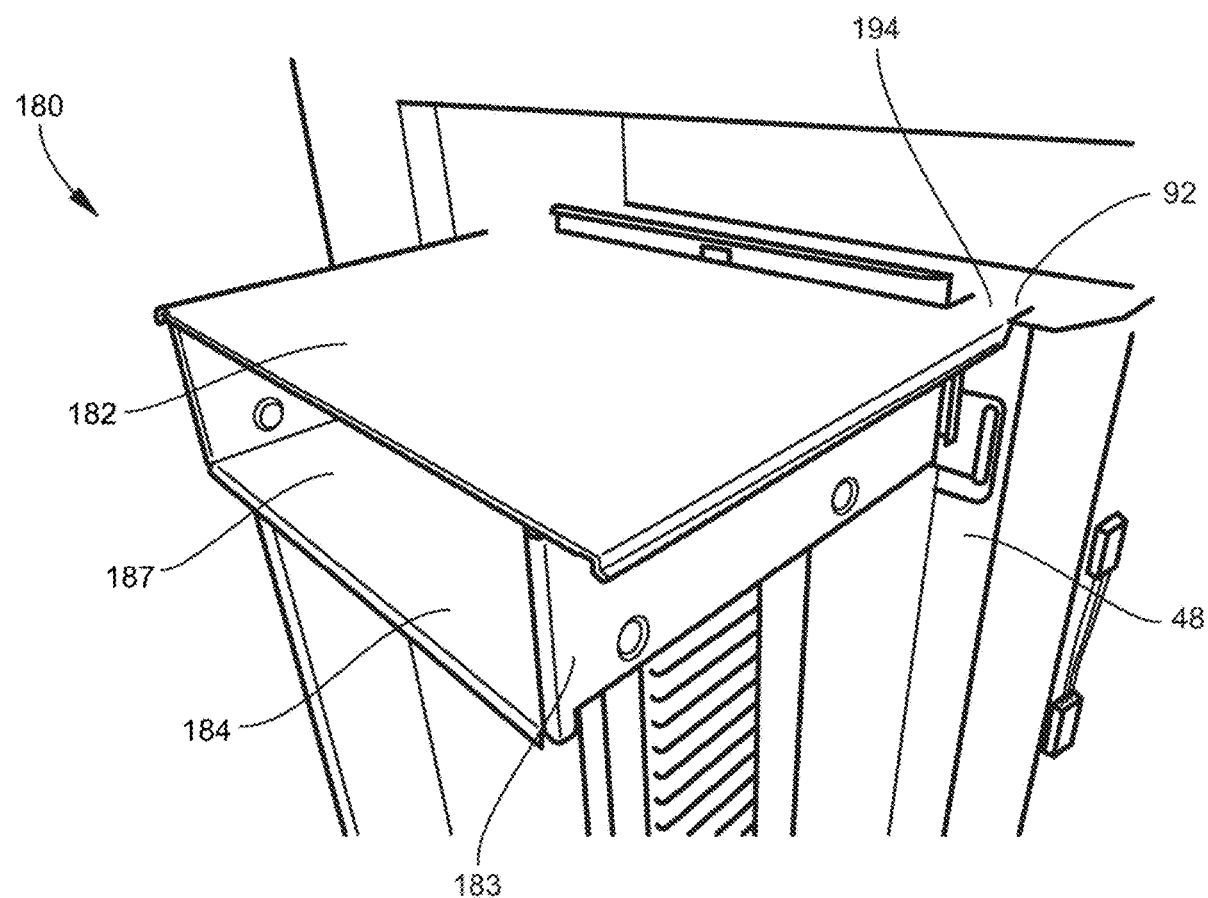
FIG. 17C shows a perspective view of the single tray loading device fully engaged to the vending machine.

FIGS. 17A-17C sequentially depict aligning and securely engaging the single tray loading device 180 with the fixed cartridge 48 of the vending machine 20. With specific reference to FIG. 17A, alignment feature 194 (tabs) of the single tray loading device 180 is initially positioned over and aligned with alignment receiver 92 (openings) on an outer surface of the fixed cartridge. Then alignment feature 194 (tabs) is advanced in a direction $D^1$ downward into alignment receiver 92 (openings) on the fixed cartridge to secure top sidewall 182 to the fixed cartridge while temporarily maintaining space between lip 196 and the fixed cartridge (intermediate secured position). Next and in view of FIGS. 17A, 17B, and 17C, lip 196 and sidewalls 182, 183, 184, and 185 of the single tray loading device 180 are rotated in a direction $D_2$ towards the fixed cartridge 48 such that lip 196 contacts, engages, and rests on an outer surface of fixed cartridge such that the single tray loading device 180 is fully secured and engaged to the fixed cartridge 48. FIG. 17C further shows a perspective view of the single tray loading device 180 fully engaged to the fixed cartridge 48 of vending machine 20 and ready to receive a temporary container 400 having a tray 36 positioned therein.

Figure 18A:
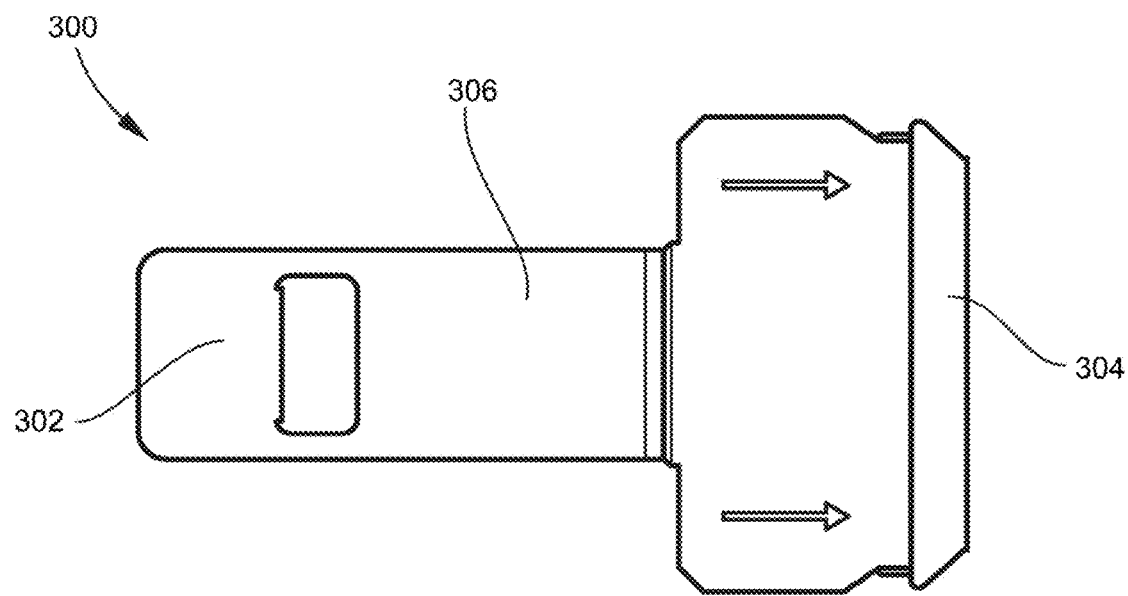
FIGS. 18A and 18B are top and bottom views respectively of the cartridge/tray guide for guiding the temporary container and tray within the single tray loading device.
Figure 18B:
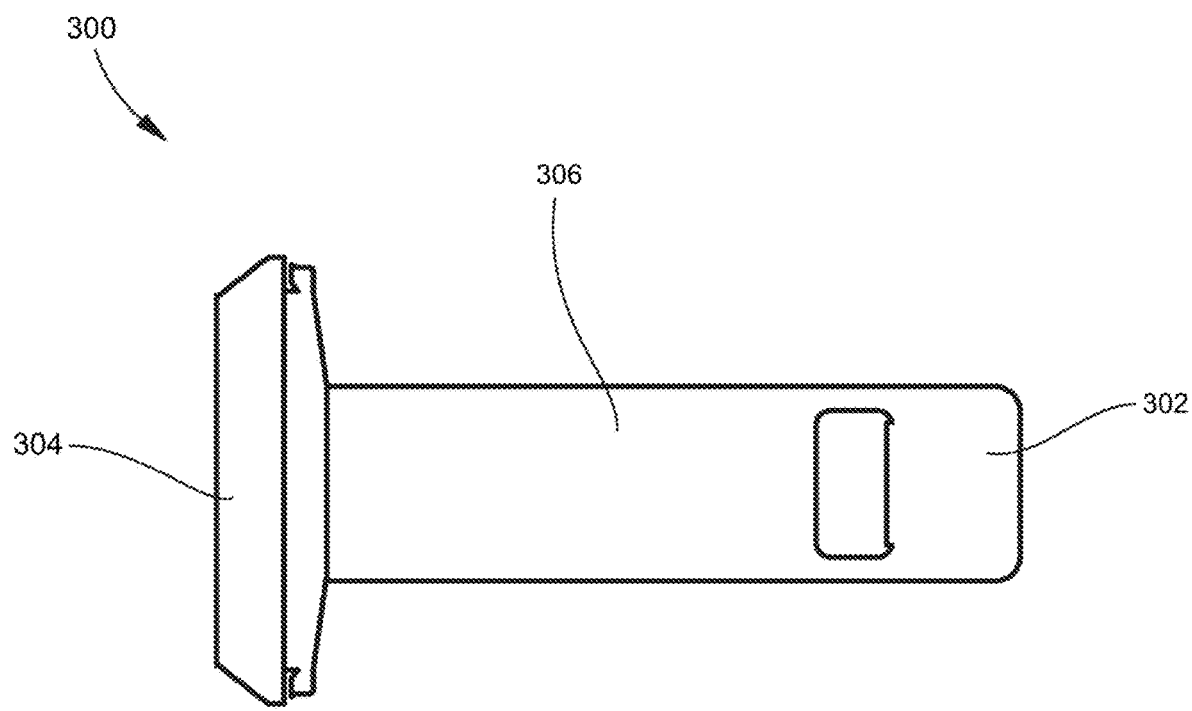

FIGS. 18A and 18B are top and bottom views respectively of the temporary container/tray guide 300 that is configured for guiding the temporary container 400 and tray 36 within the single tray loading device 180. As further shown in FIGS. 18A and 18B, the temporary container/tray guide 300 has a handle 302 for handling and maneuvering the guide and a leading edge 304 that is connected to the handle by an elongate main body 306. The leading edge 304 preferably has a planar, blunt end configured to contact and move a sidewall of temporary container 400 and/or tray 36 to further displace the sidewall of the temporary container to guide tray 36 away from the temporary container while within single tray loading device 180 and subsequently transfer tray 36 into fixed cartridge 48.

Figure 19A:
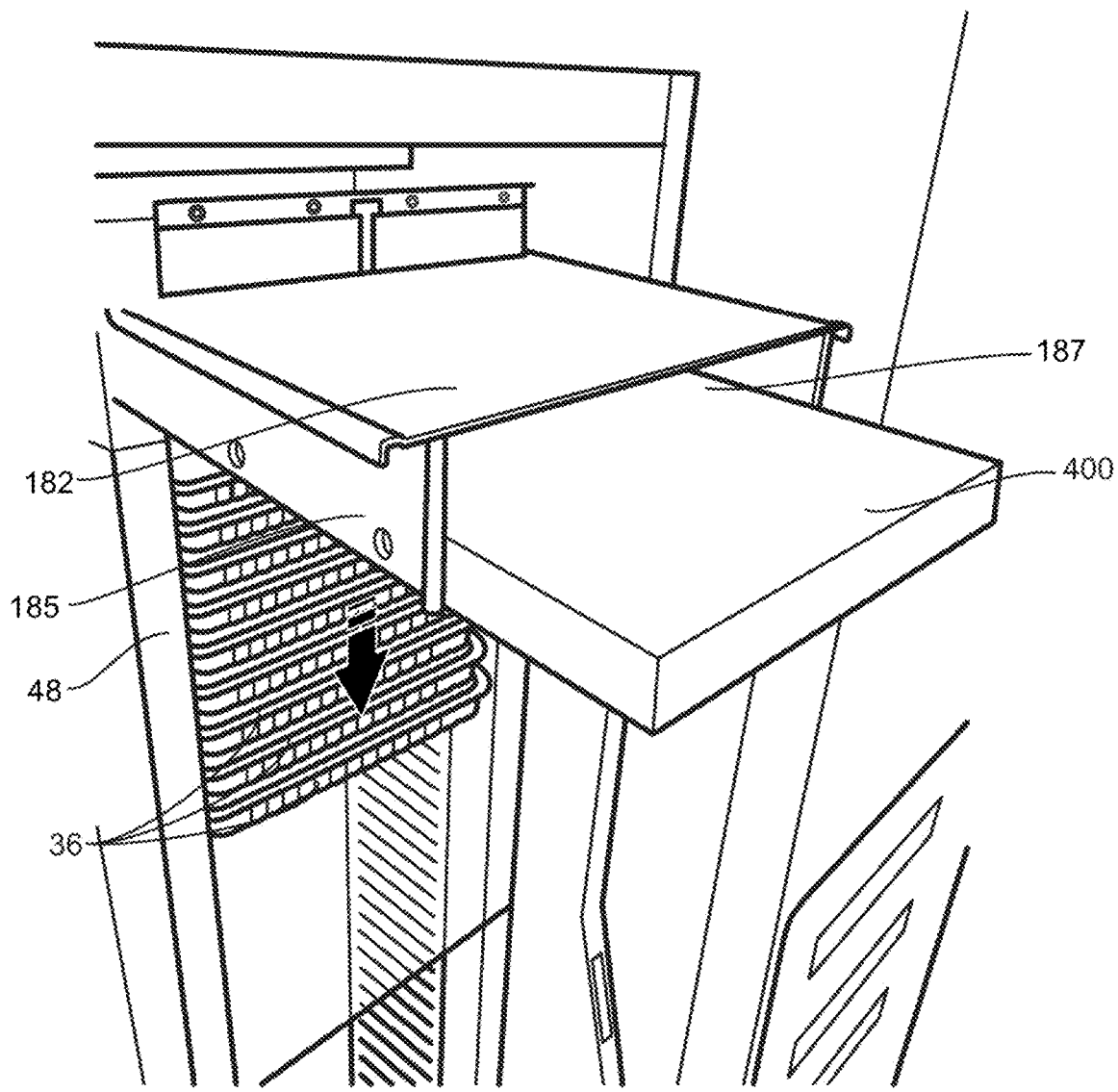
FIG. 19A shows a temporary container having a tray therein inserted within the opening of the single tray loading device in anticipation of advancing the tray there through and into the fixed cartridge of the vending machine.
Figure 19B:
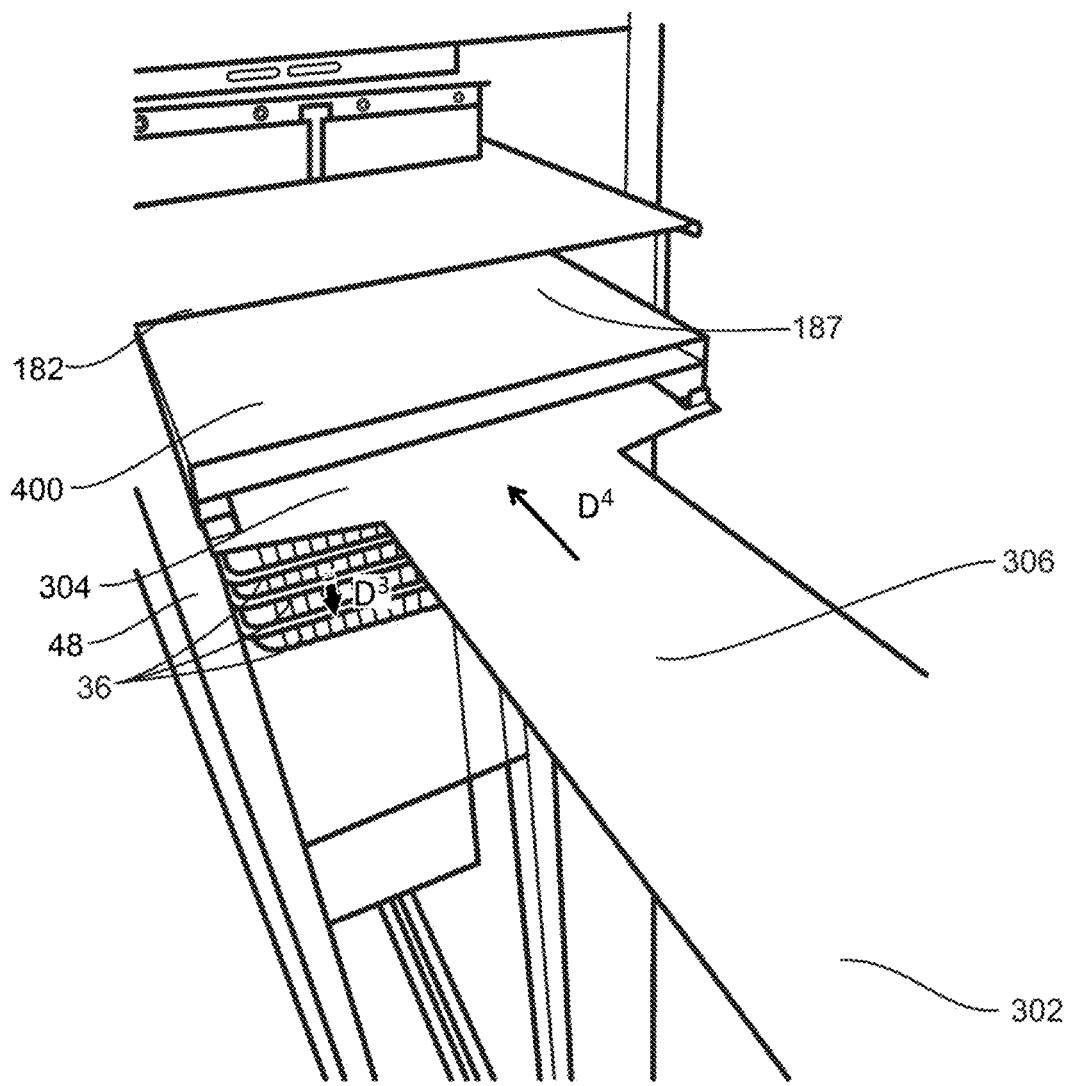
FIG. 19B shows the cartridge guide being advanced into the temporary container thereby contacting and advancing the tray out of the temporary container and into a fixed cartridge of the vending machine.

FIGS. 19A and 19B sequentially depict loading the fixed cartridge 48 with tray(s) via the single tray loading device 180. Specifically, FIG. 19A depicts a temporary container 400 having a tray 36 therein being loaded into opening 187 (or inlet) of the single tray loading device 180. FIG. 19A further depicts a plurality of trays 36 already loaded with the fixed cartridge 48, and direction $D^3$ depicts the downward direction that the trays are conveyed while loading the vending machine 20. FIG. 19B further shows the temporary container/tray guide 300 being advanced in a direction $D^4$ into the temporary container 400 towards the fixed cartridge 48 thereby contacting the tray 36 positioned in the temporary container 400 and displacing and advancing the tray 36 out of the temporary container thereby actuating and opening the internal flap 189 such that the tray 36 passes through the second opening 188 (outlet) and into a fixed cartridge of the vending machine 20 while the temporary container 400 remains within the single tray loading device. The temporary container 400 is then removed from the single tray loading device while tray 36 is conveyed down (in direction $D^3$) aligning a vacant opening in the fixed cartridge 48 with the single tray loading device 180.

A new temporary container 400 having a tray 36 therein is loaded into opening 187 (or inlet) and the loading procedure disclosed immediately above is repeated as desired and/or until the fixed cartridge(s) 48 is fully loaded. After loading the fixed cartridge 48 with trays to the desired capacity, the single tray loading device 180 is removed and the vending machine 20 is closed and prepared for use in substantially the same manner as previously discussed above.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A vending machine system for dispensing unpackaged food, comprising:
   a cabinet;
   a refrigerator disposed in the cabinet;
   an oven disposed in cabinet;
   a delivery chute;
   an interface for operating the vending machine system;
   a fixed cartridge disposed in the refrigerator, the fixed cartridge comprising a conveyor system for conveying trays of food within the fixed cartridge; and
   a single tray loading device for loading individual trays of food into the fixed cartridge, the single tray loading device configured for temporary attachment to the fixed cartridge to align an individual tray of food with the conveyor system to transfer the individual tray of food from the single tray loading device into the conveyor system of the fixed cartridge, wherein:
   the fixed cartridge comprises:
      a housing having a front opening;
      a door; and
      a drive mechanism operable for driving the conveyor system and
   the single tray loading device having:
   a first opening on a front side of the a device for loading a tray and/or a temporary container having the tray therein,
   an internal flap positioned within the single tray loading device that is configured to open and close when advancing the tray and/or temporary container having the tray therein through the single tray loading device, and
   a second opening configured to pass the tray from the single tray loading device into the conveyor system of the fixed cartridge and, if present, concurrently retaining the temporary container therein such that the temporary container may be subsequently removed from the single tray loading device to allow for another tray to be loaded within the conveyor.

2. A method for stocking the vending machine system of claim 1, comprising the steps of:
   delivering trays that are each housed in the temporary container to the location of the vending machine;
   attaching the single tray loading device to the fixed cartridge such that the front and back opening of the single tray loading device align with a single slot in a conveyor system of the fixed cartridge;
   loading a first temporary container containing a first tray with food therein into the front opening of the single tray loading device;
   dislodging the first tray from the first temporary container and passing the first tray through the second opening of the single tray loading device into the corresponding slot in the conveyor system while retaining the first temporary container in the single tray loading device;
   conveying the first tray downward in the fixed cartridge such that a vacant slot in the conveyor system aligns with the single tray loading device;
   removing the first temporary container from the single tray loading device and
   proceeding with loading, dislodging, and conveying additional trays until a predetermined number of trays have been loaded into the fixed cartridge and/or until the fixed cartridge is fully loaded;
   detaching the single tray loading device from the fixed cartridge;
   closing the fixed cartridge; and
   configuring the vending machine for subsequent use.

3. The method of claim 2, further comprising, after loading the first temporary container containing the first tray with food therein into the front opening of the single tray loading device, advancing the first temporary container within the single tray loading device in a direction away from the first opening towards the second opening of the single tray loading device.

4. The method of claim 2, further comprising contacting the temporary container containing the first tray with an internal flap positioned within the single tray loading device, with the internal flap being configured to dislodge the first tray from the first temporary container and retain the temporary container within the single tray loading device while selectively opening and closing to advance the tray into the corresponding slot in the conveyor system.

5. The method of claim 3, further comprising contacting the temporary container containing the first tray with an internal flap positioned within the single tray loading device, with the internal flap being configured to dislodge the first tray from the first temporary container and retain the temporary container within the single tray loading device while selectively opening and closing to advance the tray into the corresponding slot in the conveyor system.

* * * * *